US012810064B2

(12) United States Patent
Khosla et al.

(10) Patent No.: US 12,810,064 B2
(45) Date of Patent: Nov. 24, 2026

(54) ENHANCED PLUGIN SELECTION IN CONVERSATIONAL ARTIFICIAL INTELLIGENCE SYSTEMS THROUGH CONTEXTUAL LARGE LANGUAGE MODEL PROMPTS

(71) Applicant: Amazon Technologies, Inc., Seattle, WA (US)

(72) Inventors: Sopan Khosla, Sunnyvale, CA (US); Vinayshekhar Bannihatti Kumar, Santa Clara, CA (US); Rashmi Gangadharaiah, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 206 days.

(21) Appl. No.: 18/615,923

(22) Filed: Mar. 25, 2024

(65) Prior Publication Data

US 2025/0298970 A1 Sep. 25, 2025

(51) Int. Cl.
*G06F 40/20* (2020.01)

(52) U.S. Cl.
CPC .................................... *G06F 40/20* (2020.01)

(58) Field of Classification Search
CPC ....................................................... G06F 40/20
See application file for complete search history.

(56) References Cited

U.S. PATENT DOCUMENTS

2021/0173682 A1 6/2021 Chakraborti et al.
2023/0259705 A1* 8/2023 Tunstall-Pedoe .... G06N 3/0499 704/9
2024/0273291 A1* 8/2024 Smith ..................... G06F 40/56
(Continued)

FOREIGN PATENT DOCUMENTS

| | | | |
|---|---|---|---|
| CN | 109074292 | A | 12/2018 |
| CN | 117076629 | A | 11/2023 |
| WO | 2017/184587 | A1 | 10/2017 |

OTHER PUBLICATIONS

Liu, J., & Mozafari, B. (2024). Query rewriting via large language models. arXiv preprint arXiv:2403.09060. (Year: 2024).*
(Continued)

*Primary Examiner* — Philip H Lam
(74) *Attorney, Agent, or Firm* — Nicholson De Vos Webster & Elliott LLP

(57) ABSTRACT

Techniques disclosed integrate generative AI assistant plugins with a large language model (LLM) to enhance conversational interactions. The techniques include receiving a user's input and retrieving relevant text passages based on a query derived from this input. A complex LLM prompt is generated, including these passages, descriptions of candidate plugins, and the user's input. This prompt is sent to an LLM service, which selects the most suitable plugin for the user's needs. Following this, a query is sent to the chosen plugin, and its response is used to craft the agent's reply to the user. The techniques emphasize dynamic selection and integration of specialized plugins based on real-time user input, leveraging LLM capabilities to interpret and recommend the best plugin response. This approach ensures tailored, informed interactions by providing responses that are both relevant and enriched with specialized plugin knowledge or functionality.

20 Claims, 15 Drawing Sheets

(56) References Cited

U.S. PATENT DOCUMENTS

| | | | | |
|---|---|---|---|---|
| 2024/0289395 | A1* | 8/2024 | Zhou | G06F 16/9532 |
| 2024/0296425 | A1* | 9/2024 | Rosenkranz | G06F 40/197 |
| 2024/0303441 | A1* | 9/2024 | Sobhy Deraz | G06T 11/206 |
| 2024/0403112 | A1* | 12/2024 | Mohammed | G06Q 10/06311 |
| 2025/0021744 | A1* | 1/2025 | D'Agostino | G06F 16/3329 |
| 2025/0036887 | A1* | 1/2025 | Sukhija | G06F 40/205 |
| 2025/0053582 | A1* | 2/2025 | Yao | G06F 40/35 |
| 2025/0053748 | A1* | 2/2025 | Fayyaz | G06F 40/35 |
| 2025/0069617 | A1* | 2/2025 | Carbune | G06F 16/3329 |
| 2025/0258998 | A1* | 8/2025 | Villa | G06N 3/08 |
| 2025/0272652 | A1* | 8/2025 | Makhija | G06F 40/205 |

OTHER PUBLICATIONS

Li, S., Lv, F., Jin, T., Li, G., Zheng, Y., Zhuang, T., . . . & Ma, Q. (2022, October). Query rewriting in taobao search. In Proceedings of the 31st ACM International Conference on Information & Knowledge Management (pp. 3262-3271). (Year: 2022).*

Wang, X., Han, B., Tai, Z., Tian, J., Wang, Y., Yan, J., & Tian, Y. (2023). New interaction paradigm for complex eda software leveraging gpt. arXiv preprint arXiv:2307.14740. (Year: 2023).*

International Search Report and Written Opinion, PCT App. No. PCT/US2025/020432, Jun. 20, 2025, 10 pages.

* cited by examiner

ENHANCED PLUGIN SELECTION IN CONVERSATIONAL ARTIFICIAL INTELLIGENCE SYSTEMS THROUGH CONTEXTUAL LARGE LANGUAGE MODEL PROMPTS

BACKGROUND

Generative artificial intelligence (AI)-powered assistants developed by cloud computing service providers aim to streamline and enhance productivity within workplaces. By harnessing the power of artificial intelligence, these assistants offer fast, relevant answers to questions, generate content, and execute actions by leveraging vast amounts of data, expertise, and systems within an organization. Users can interact with these assistants in a conversational manner, allowing for personalized, tailored, and actionable advice suited to their specific work needs.

Designed to assist with a variety of tasks related to cloud computing, such as application development, troubleshooting, and learning best practices, these assistants feature capabilities like conversational Q&A, code transformation, instance selection, network troubleshooting, and integration with development environments. These assistants serve as a versatile tool for developers, IT professionals, and businesses looking to optimize their operations with AI-driven insights.

Some cloud-based generative AI-assistants support "plugins." A plugin is designed to enhance the functionality of an assistant by enabling it to perform specific user-requested tasks within other cloud-based services or applications. For example, one plugin may allow for creating work items that represent various tasks, activities, or needs within a cloud-based project management tool, another plugin may enable the creation of a record of a customer's question, feedback, issue, or problem in a cloud-based customer relationship management (CRM) platform, yet another plugin may facilitate the creation of an incident record representing an unplanned interruption to an information technology (IT) service or a reduction in the quality of an IT service in a cloud-based IT service management platform, and still yet another plugin may permit the creation of a ticket representing a communication or request for assistance from a customer or user in a cloud-based customer service platform.

A plugin is invoked through a user's conversational interaction with the assistant. When a user asks a question or makes a request that the assistant determines can be handled by a plugin, the assistant may prompt the user to confirm the action. For instance, if a user asks to create a ticket in a customer support system and a corresponding plugin is enabled, the assistant may recognize this intent, generate a preview of the action (such as the ticket details), and ask for user confirmation. Upon receiving confirmation, the assistant may proceed to execute the action using the plugin, such as creating the ticket in the specified system. This process integrates seamlessly into the conversational flow, allowing users to perform tasks efficiently without leaving the assistant chat interface.

A challenge facing cloud-based generative AI-assistants is determining which plugin a user intends to invoke. Users may express their needs in various ways, using natural language that can be ambiguous or lack specificity. Given the potential for a wide range of tasks that could be performed by different plugins, the assistant must understand not only the content of the request but also the intent behind it. This involves complex natural language processing (NLP) and understanding (NLU) capabilities to discern subtle nuances in language, differentiate between similar tasks that could be handled by multiple plugins, and identify which specific action the user wants to take. Furthermore, the system must do this in a way that feels intuitive and seamless to the user, without requiring them to memorize specific commands or syntax for activating plugins, thus ensuring a smooth and efficient user experience. Thus, solutions that improve the user experience would be appreciated.

BRIEF DESCRIPTION OF THE DRAWINGS

The detailed description of certain embodiments of the invention are understood with reference to the following figures.

DETAILED DESCRIPTION

Figure 1:
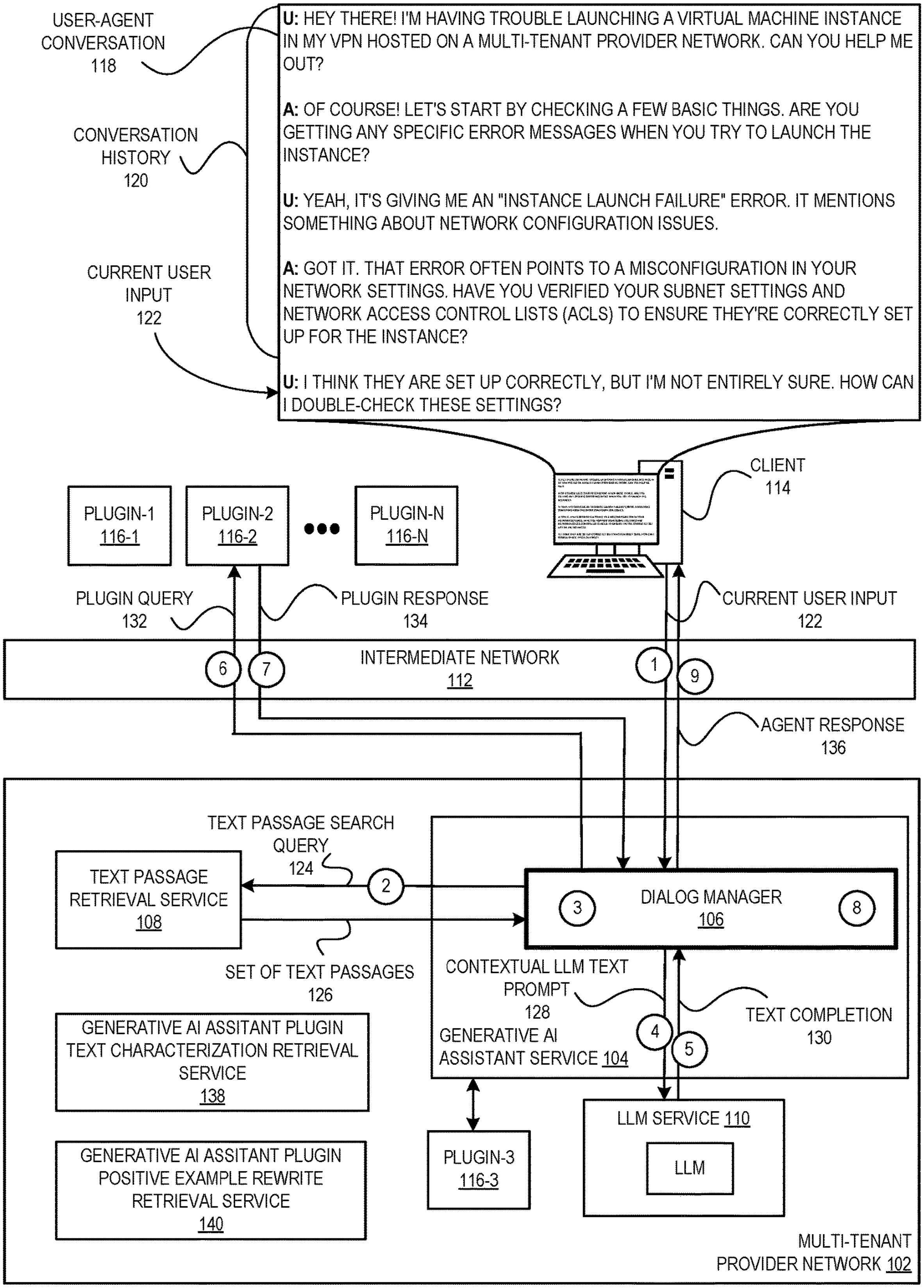
FIG. 1 illustrates an example system and method for enhanced plugin selection in conversational artificial intelligence systems through contextual large language model prompts.

Disclosed herein are systems, methods, and non-transitory computer-readable media (generally, "techniques") for enhanced plugin selection in conversational Artificial Intelligence (AI) systems through contextual Large Language Model (LLM) prompts.

In an embodiment, the techniques encompass a process utilized within a multi-tenant provider network environment for handling user inputs via a conversational AI system. Initially, a user's input is captured by a dialog manager from the client through an intermediate network. This input prompts the retrieval of relevant text passages from a text passage service based on either the direct user input or a derived query. Following this, the dialog manager crafts a complex text prompt incorporating these passages, descriptions of potential AI assistant plugins, and the user's input or its derivative. This prompt is then forwarded to a LLM service, which processes it and returns a completion suggesting a specific AI assistant plugin from the available options. Subsequently, the dialog manager communicates with the selected plugin by sending a query and receiving a response. The final step involves the dialog manager creating a response based on the plugin's feedback and transmitting it back to the client, thus completing the cycle of interaction in this conversational AI framework.

The inclusion of the retrieved set of text passages in the LLM prompt enhances the process of selecting the most appropriate generative AI assistant plugin to handle the user's input. This approach leverages the rich context provided by the text passages, which are relevant to the user's current input, to inform the LLM's understanding and analysis. By integrating these passages, the dialog manager enables the LLM to make more informed decisions based on a broader context that includes not just the user's immediate input but also related information and nuances captured in the retrieved passages. This context-rich prompt helps the LLM to discern the subtleties and specific needs expressed in the user's query, thereby improving its ability to identify the plugin that is best suited to generate a relevant and accurate response. This method ensures that the plugin selection process is not solely dependent on the user's latest input but is augmented by a comprehensive understanding of related concepts and information, leading to a higher accuracy in matching the user's needs with the capabilities of the appropriate AI assistant plugin.

In an embodiment, there is a distinction between the retraining frequency of the LLM and the updating frequency of text passage retrieval service indexes. This distinction is driven by the characteristics and functions of each component in the multi-tenant provider network environment. The LLM is developed to comprehend and generate text based on extensive training on vast datasets. This training equips the LLM with a wide-ranging understanding of language, context, and knowledge up to the point of its last update, enabling it to apply this broad knowledge base to interpret and respond to user inputs effectively. Retraining the LLM is a substantial endeavor, requiring considerable computational resources, time, and data to reflect new knowledge or linguistic patterns. Given these demands, the LLM is updated less frequently, with each iteration designed to last a significant period before necessitating retraining.

Conversely, the indexes of text passage retrieval services within the same network are designed to provide timely, relevant information by reflecting the latest available content. These indexes are updated much more frequently to capture the most current information, changes in data, and new developments. This continuous updating process ensures that when the dialog manager retrieves text passages relevant to a user's input, it accesses the most up-to-date information, which is useful for maintaining the accuracy and relevance of the responses provided by the conversational AI system.

The strategic difference in update frequencies between the LLM and text passage indexes is thus rooted in their distinct roles: the LLM provides a stable, broad base of language understanding and generation capabilities, while text passage indexes offer dynamic, potentially up-to-the-minute content. This approach ensures that the conversational AI system can leverage deep, generalized language capabilities for understanding and generating responses, while also incorporating the latest relevant information into those responses through the retrieved text passages, effectively balancing the need for deep knowledge with the requirement for current information.

Incorporating the retrieved set of text passages into the LLM prompt improves the selection accuracy of the most appropriate plugin in an embodiment where the LLM lacks prior training on information specific to one or more or all candidate plugins. This strategy compensates for the model's potential knowledge gaps regarding the unique functionalities, strengths, or application domains of each plugin within the conversational AI system. By embedding relevant text passages alongside the user's input and descriptions of candidate plugins in the prompt, the LLM is supplied with a rich, contextual backdrop that mirrors the kind of information it might not have learned during its training phase.

This enriched input set allows the LLM to perform a more nuanced analysis and comparison between the user's needs and the capabilities of each plugin, as inferred from the text passages. These passages effectively serve as an on-the-fly briefing for the LLM, offering insights into topics, terminologies, or user intents that are directly relevant to the current conversation. Consequently, even if the LLM has not been explicitly trained on a candidate plugin's specifics, the inclusion of targeted text passages helps bridge this knowledge gap, guiding the LLM toward a more informed and accurate plugin selection. This method ensures that the AI assistant's responses remain highly relevant and tailored to the user's input, leveraging contextual understanding to optimize the match between user queries and plugin functionalities, thereby enhancing the overall effectiveness of the conversational AI system.

In an embodiment, the techniques encompass additional steps of sending a text characterization search query to a generative AI assistant plugin text characterization retrieval service within the network. This query is formulated based on the current user input or a version of the input that has been appropriately generated. The core objective of this step is to procure a set of text characterizations, which are essentially detailed descriptions or attributes related to the generative AI assistant plugins. By receiving these text characterizations from the retrieval service, the dialog manager is equipped with a deeper understanding of the plugins' functionalities and characteristics. This enhancement facilitates a more informed selection of the most appropriate generative AI assistant plugin for generating responses to the user's input, by leveraging detailed insights into the capabilities and specializations of each plugin within the conversational AI system.

Retrieving a set of text characterizations relevant to the text characterization search query directly enhances the accuracy of the LLM in selecting the most appropriate plugin to handle the user's input. This step enriches the input to the LLM with detailed descriptions or profiles of each candidate generative AI assistant plugin, which include their functionalities, expertise, and unique characteristics. By incorporating these text characterizations into the LLM's decision-making process, the model gains a deeper understanding of the nuances and specific capabilities of each plugin, beyond what is possible through the analysis of the user's input alone.

This enriched context allows the LLM to perform a more nuanced evaluation of how well each plugin's attributes align with the requirements inferred from the user's input. For example, if the user's input suggests a need for expertise in a particular domain or a specific type of interaction, the LLM can use the detailed characterizations to identify the plugin that is most likely to provide an accurate and relevant response. This method significantly improves the LLM's ability to make informed selections, as it can consider a broader range of factors when matching the user's needs with a plugin's capabilities.

Therefore, the retrieval and inclusion of text characterizations as part of the LLM's input not only enhances the LLM's understanding of the available plugins but also enables a more precise selection process. This leads to a higher likelihood that the chosen plugin will deliver a response that accurately addresses the user's query, thereby improving the efficiency and effectiveness of the conversational AI system. The approach ensures that the LLM's plugin selection is informed by a comprehensive understanding of both the user's immediate needs and the detailed capabilities of each plugin, optimizing the match between user inquiries and plugin responses.

In an embodiment, the dialog manager conducts a more granular analysis for each candidate AI assistant plugin in the set of candidates. Specifically, for each plugin, the dialog manager sends out a positive example rewrite search query, which is formulated based on the current user input or a version generated from it. The purpose of this query is to retrieve a set of one or more positive example rewrites that exemplify how to rewrite a user input to a corresponding plugin query for submission to the plugin. These examples are then incorporated into the text characterizations for each plugin, providing a richer, more detailed depiction of how each plugin can be invoked. By integrating these positive example rewrites into the selection process, the LLM is better equipped to rewrite the user's query to a form compatible with the plugin, thereby enhancing the accuracy and relevance of the conversational AI system's responses.

These and other embodiments will now be described with respect to the figures.

FIG. 1 illustrates an example multi-tenant provider network environment in which techniques for enhanced plugin selection in conversational artificial intelligence systems through contextual large language model prompts are implemented.

At a high level and according to an embodiment, a multi-tenant provider network environment 100 includes a multi-tenant provider network 102, an intermediate network 112, and a client 114 (which generically represents one of potentially many clients in the multi-tenant provider network environment 100). In this setting, a dialog manager 106 of a generative AI assistant service 104 receives a current user input 122 from the client 114 via the intermediate network 112. Utilizing this current user input 122, the dialog manager 106 retrieves a set of text passages 126 relevant to a text passage search query 124, which is or is based on the current user input 122, from a text passage retrieval service 108 within the multi-tenant provider network 102.

Subsequently, the dialog manager 106 generates a LLM text prompt 128 incorporating the set of text passages 126, text characterizations of candidate generative AI assistant plugins, and a current user text input. The current user text input is the current user input 122 or is generated based on the current user input 122. This LLM text prompt 128 is sent to a LLM service 110, which returns a text completion 130 indicating a specific generative AI assistant plugin (e.g., plugin 116-2) from the candidate set. The dialog manager 106 then sends a plugin query 132 to the identified plugin and receives the plugin response 134. Based on this response 134, the dialog manager 106 generates an agent response 136 and sends it back to the client 114 through the intermediate network 112. Thus, the techniques encompass a comprehensive process for enhancing user-agent conversations by leveraging generative AI to dynamically process inputs and generate contextually relevant responses.

Returning to the top of FIG. 1, the multi-tenant provider network environment 100 refers to a complex network infrastructure shared by multiple tenants—distinct users, organizations, or services—that simultaneously utilize the multi-tenant provider network 102's resources and services. This multi-tenant provider network environment 100 includes the multi-tenant provider network 102 itself, the intermediate network 112, and clients (e.g., client 114) at which user-agent conversations (e.g., user-agent conversation 118) are presented.

The multi-tenant provider network 102 is designed to host various services, including the generative AI assistant service 104, which leverages a LLM of the LLM service 110 and specialized plugins 116 to process and respond to user inputs (e.g., current user input 122). The inclusion of the intermediate network 112 facilitates secure and efficient communication between clients (e.g., client 114) and the provider's backend services such as the dialog manager 106. This setup allows for scalable, flexible, and customizable interactions, where the AI assistant can serve a range of user needs by accessing different plugins and resources within the multi-tenant provider network 102. The multi-tenant provider network 102 is designed to support high levels of data traffic and complex processing tasks while maintaining data isolation and operational integrity for each tenant, ensuring that the services provided are both robust and reliable.

The multi-tenant provider network 102 is a network infrastructure that supports a shared environment for various tenants—entities such as individuals, organizations, or different services—that use the multi-tenant provider network 102's resources simultaneously. This multi-tenant provider network 102 is a component for hosting and managing the operations of various services including the generative AI assistant service 104, the LLM service 110, and the text passage retrieval service 108.

The multi-tenant provider network 102 is designed to handle the processing and exchange of data among its services, such as dialog management, text passage retrieval, and interaction with large language models, while ensuring that the services remain isolated and secure for each tenant. This isolation is useful for maintaining the privacy and integrity of the data and operations of each tenant. The multi-tenant provider network 102 facilitates the reception of user inputs (e.g., current user input 122) through the intermediate network 112, processes these inputs to generate responses (e.g., agent response 136) via the dialog manager 106, and interacts with various generative AI assistant plugins 116 and services to provide accurate and relevant responses (e.g., agent response 136) to users. The multi-tenant aspect of the multi-tenant provider network 102 allows for a scalable and flexible approach to serving a set of users and applications, making it possible to tailor the AI assistant's responses to specific user needs while leveraging shared infrastructure and services to optimize efficiency and reduce operational costs.

The generative AI assistant service 104 operates as a component of the multi-tenant provider network 102. This generative AI assistant service 104 employs the dialog manager 106 as its core, which is tasked with orchestrating the flow of interactions between users and the AI through a series of defined steps. The dialog manager 106 acts as the central processing unit that orchestrates the flow of information and interactions between the user and the AI system. Initially, the dialog manager 106 receives user inputs (e.g., current user input 122) from clients (e.g., client 114), which could be any device or interface where users interact with the AI assistant. These inputs are then processed to retrieve relevant information from a text passage retrieval service 108, indicating the generative AI assistant service 104's capability to understand and contextualize user queries.

The generative aspect of the AI assistant comes into play when the dialog manager 106 generates the comprehensive LLM text prompt 128. This LLM text prompt 128 includes the retrieved set of passages 126, descriptions of potential AI assistant plugins (which can be seen as specialized functionalities or modules designed to handle specific types of queries), and the current user input 122 or a text representation of the current user input 122. This LLM text prompt 128 is sent to the LLM service 110, highlighting the assistant's use of advanced language processing technologies to interpret and respond to user queries.

The LLM service 110, upon receiving the contextual LLM text prompt 128, generates the text completion 130. This text completion 130 effectively selects the most appropriate AI assistant plugin (e.g., plugin 116-2) to handle the current user input 122, showcasing the assistant's adaptability and intelligence in leveraging different AI capabilities to meet user needs. Following this, the dialog manager 106 communicates with the selected plugin, receives the tailored plugin response 134, and finally generates the agent response 136 based on this information, which is then sent back to the client 114.

This generative AI assistant service 104 exemplifies a highly interactive, intelligent, and flexible system capable of handling a wide range of user queries. By integrating various AI technologies and plugins 116-1, 116-2, 116-3, . . . 116-N, it offers personalized and contextually relevant responses (e.g., agent response 136), enhancing the user experience. The generative AI assistant service 104's design within the multi-tenant provider network 102 is useful for serving a user base while maintaining efficiency, scalability, and security.

The text passage retrieval service 108 operates as a component for sourcing information. This text passage retrieval service 108 is designed to efficiently locate and retrieve text passages that are relevant to the current user input 122 as represented by text passage search query 124, acting as a step in the process of generating informed and accurate responses to user queries. Upon receiving the text passage search query 124 from the dialog manager 106, which is based on or directly related to the current user input 122, the text passage retrieval service 108 conducts a search to identify pertinent text passages from its database or indexed sources.

This process is useful to the overall functionality of the AI assistant service, as it ensures that the information used to generate responses (e.g., agent response 136) is both relevant and contextually appropriate. The retrieved set of text passages 126 are then incorporated into the contextual LLM text prompt 128 by the dialog manager 106, alongside other elements such as characterizations of candidate AI assistant plugins and the current user input 122 or a text representation thereof. This enriched LLM text prompt 128 is subsequently processed by the LLM service 110 to determine the most suitable plugin for generating the final agent response 136.

The text passage retrieval service 108 functions as an information-gathering tool within the multi-tenant provider network 102. It supports the AI assistant's ability to understand and process user queries by providing a base of knowledge from which the LLM service 110 can draw.

The LLM service 110 operates by receiving the specially constructed LLM text prompt 128 from the dialog manager 106, which includes a blend of retrieved set of text passages 126 relevant to the current user input 122, characterizations of various candidate AI assistant plugins, and the current user input 122 or a text representation thereof. The composition of this LLM text prompt 128 is designed to leverage the LLM's advanced capabilities in understanding and synthesizing information from diverse inputs.

The LLM service 110's function is to process the contextual LLM text prompt 128 and produce the text completion 130. This text completion 130 is not merely an answer to the current user input 122 but an intelligent selection of the most appropriate generative AI assistant plugin from the set of candidates. The LLM service 110 can assess the relevance and suitability of different plugins for handling specific user queries, based on the context provided in the contextual LLM text prompt 128.

By analyzing the combined data from the set of text passages 126, plugin characterizations, and user input, the LLM service 110 can identify the most effective plugin for generating the agent response 136, thereby ensuring that the user receives a reply that is both relevant and tailored to their specific needs.

The LLM service 110 encompasses the LLM for interpreting user inputs (e.g., current user input 122) and facilitating the selection of the most appropriate generative AI assistant plugin to handle the current user input 122. The LLM is an advanced artificial intelligence system trained on vast amounts of text data, enabling it to understand and generate human-like text based on the input it receives. When the dialog manager 106 sends the contextual LLM text prompt 128—comprising the set of relevant text passages 126, characterizations of candidate plugins, and the current user input 122 or a text version thereof—the LLM processes this information to produce the text completion 130. This text completion 130 is tailored to indicate which generative AI assistant plugin, among the set of candidates, is best suited to address the user's current need or question. This indicates a sophisticated level of understanding and contextual processing, allowing the AI to effectively bridge the gap between the current user input 122 and the vast array of specialized functionalities offered by the different plugins. The LLM thus acts as a useful intermediary, intelligently navigating the plugin landscape to enhance the overall efficiency and relevance of the AI assistant's responses.

The LLM of the LLM service 110 used to generate the text completion 130 from the contextual LLM text prompt 128 can be any of various different types of LLMs including any one of or a hybrid of two or more of the following types of LLMs: a general-purpose LLM, a domain specific LLM, a multilingual LLM, an interactive LLM, or a customizable LLM.

A general-purpose LLM is versatile and capable of understanding and generating human-like text across a wide range of topics and formats. These models could be used to interpret user inputs accurately, determine the context of inquiries, and select the appropriate plugin based on the nuanced understanding of language and context.

A domain specific LLM may be used for environments where conversations are likely to revolve around specific subjects (e.g., medical, legal, or technical discussions). A domain specific LLM trained on specialized datasets could be employed. These models offer deeper insights and more accurate selections within their areas of expertise, ensuring that the dialog manager chooses plugins that are best suited for detailed and accurate responses in particular domains.

In a multi-tenant provider network environment catering to a global audience, a multilingual LLM capable of understanding and generating text in multiple languages could be used. These models would enable the system to cater to users in their native languages, selecting plugins that are designed to handle queries in specific languages or that are best equipped to deal with cultural and linguistic nuances.

An interactive LLM specifically optimized for interactive applications, including conversational AI, cloud be used. These models are designed to handle the back-and-forth nature of conversations, managing context over multiple turns of dialogue, and ensuring that the plugin selection is not only based on the immediate input but also on the broader context of the ongoing conversation.

A customizable LLM that allows for fine-tuning on specific datasets or to incorporate proprietary knowledge bases could also be used. Such models can be tailored to the unique needs of the multi-tenant provider network 102, improving the dialog manager 106's ability to select the most relevant plugin based on customized criteria, such as proprietary technical support information, specialized product details, or unique service offerings.

The LLM of the LLM service 110 is an advanced artificial intelligence system designed to understand, interpret, and generate human-like text based on vast amounts of training data. The LLM is built using deep learning techniques, particularly neural networks, that allow them to analyze and process natural language at scale. The LLM is trained on diverse datasets comprising text from various sources such as books, articles, websites, and other sources, enabling the LLM to grasp a wide range of linguistic patterns, contexts, and nuances.

This extensive training equips the LLM with the ability to perform a variety of natural language processing tasks, including but not limited to text completion, translation, summarization, question answering, and conversation generation. Their capability to understand context and generate coherent, contextually relevant responses makes them particularly valuable in applications ranging from conversational AI and customer service bots to content creation and language analysis tools. The sophistication of the LLM lies in their deep neural network architecture, which allows them to process and generate text in a way that mimics human language use, making them a useful technology in the field of AI-driven natural language understanding and generation.

The intermediate network 112 serves as a communication layer that facilitates the exchange of information between the client 114 (where the user-agent conversation 1118 is presented) and the multi-tenant provider network 102 (where the generative AI assistant service 104 operates). This intermediate network 112 acts as a bridge, ensuring that data, such as user inputs (e.g., current user input 122) and agent responses (e.g., agent response 136), can be securely and efficiently transmitted across different environments.

The use of the intermediate network 112 encompasses the presence of network infrastructure that can handle the complexities of routing, security, and data transmission standards necessary for cloud-based services. This network layer may encompass various technologies and protocols designed to optimize latency, maintain data integrity, and ensure the confidentiality of the exchanged information. It enables seamless communication despite the physical and logical separations between the client 114's environment and the provider's infrastructure, thereby supporting the real-time, responsive nature of the generative AI assistant service 104. The intermediate network 112's design and implementation are useful in achieving a user experience that is both fluid and secure, accommodating the dynamic nature of conversational AI interactions within the multi-tenant provider network environment 100.

The client 114 refers to the user-facing endpoint, where the user-agent conversation 118 is presented and interacted with by the end-user. This client 114 can be a software application, web interface, or any digital platform capable of hosting an interactive AI assistant. Client 114 acts as the interface through which users input their queries or commands and receive responses generated by the AI system. It is connected to the generative AI assistant service 104 through the intermediate network 112, enabling it to send user inputs (e.g., current user input 122) to the dialog manager 106 of the generative AI assistant service 104 and receive the corresponding AI-generated responses (e.g., agent response 136).

The client 114's role is useful in providing an accessible, user-friendly environment for engaging with the AI assistant, ensuring that the technology is available to users across various devices and platforms. It is designed to capture user inputs accurately, display responses clearly, and maintain a seamless flow of conversation, thereby facilitating an engaging and efficient interaction between the user and the AI system. Client 114 could range from a mobile app on a smartphone, a chat interface on a website, a voice-activated device in a smart home setup, or any other interactive technology through which users can communicate with the AI assistant.

Each plugin 116-1, 116-2, . . . , 116-N refers to a modular software component within the generative artificial intelligence (AI) assistant service framework, designed to handle specific types of queries or perform tasks as part of the overall AI service. These plugins 116 act as specialized assistants or modules that the dialog manager 106 can selectively invoke based on the needs identified in the current user input 122.

Each plugin 116-1, 116-2, 116-3, . . . , 116-N is characterized by a set of text characterizations, indicating its area of expertise, functional capabilities, or the type of queries it is best suited to address. When the dialog manager 106, after processing the current user input 122 and consulting the LLM, identifies a particular plugin (e.g., 116-2) as the most appropriate for handling the current user input 122, it sends the plugin query 132 to that selected plugin. The selected plugin then processes this plugin query 132, leveraging its specialized knowledge or functionality, and generates the plugin response 134. This plugin response 134 is sent back to the dialog manager 106, which then crafts the final agent response 136 to be sent to the client 114. This modular approach allows the generative AI assistant service 104 to cover a broader range of topics or services efficiently, by integrating and utilizing specialized knowledge or capabilities housed within each plugin 116-1, 116-2, . . . , 116-N, thereby enhancing the overall responsiveness, accuracy, and utility of the AI assistant for the end-user.

The plugins 116-1, 116-2, 116-3, . . . , 116-N within the generative AI assistant service 104 framework are designed to extend the functionality and knowledge base of the AI system, enabling it to address a wide variety of user queries and tasks. Some of these plugins (e.g., plugin 116-3) may be situated within the multi-tenant provider network 102 itself, directly integrated into the generative AI assistant service 104's infrastructure. These internal plugins can quickly and securely access the generative AI assistant service 104's, the LLM service 110's, or the multi-tenant provider network 102's resources, data, and capabilities, offering seamless performance and reliability due to their close integration with the core system.

On the other hand, there can also be external plugins (e.g., plugins 116-1 and 116-2), which are not hosted within the multi-tenant provider network 102 but are connected to it via the intermediate network 112. These external plugins allow the generative AI assistant service 104 to leverage specialized capabilities or access unique datasets that reside outside the multi-tenant provider network 102's infrastructure. This architecture allows for a flexible and scalable system, where new functionalities can be added as external plugins without disrupting the core service infrastructure. It also enables the generative AI assistant service 104 to tap into a wider ecosystem of tools, services, and data sources, enhancing the generative AI assistant service 104's versatility and adaptability to meet user needs.

In an embodiment, the generative AI assistant service 104 is designed to dynamically integrate new plugins, enhancing its capabilities, and ensuring it remains current with evolving user needs and technological advancements. Even after the most recent retraining of the LLM of the LLM service 110, the generative AI assistant service 104 can incorporate new plugins through a process that ensures they are recognized and utilized by the dialog manager 106 for handling specific queries or tasks. This adaptability is facilitated by the system's architecture, which allows for the modular addition of plugins without requiring immediate retraining of the LLM.

In an embodiment, when a new plugin is installed, its text characterizations—descriptions of its functions, expertise, or the types of queries it is designed to handle—are registered with the dialog manager or indexed by a retrieval service. These characterizations enable the dialog manager 106 to understand when and how to employ the new plugin effectively. Since the dialog manager 106 operates as the central coordinator, directing user queries to the most appropriate plugins based on the LLM's analysis of user input and the available plugin characterizations, it can immediately start routing relevant queries to the new plugin based on its registered or indexed capabilities.

This process allows the generative AI assistant service 104 to evolve and expand its offerings without significant downtime or disruptions. The inclusion of new plugins post-LLM retraining highlights the system's flexibility and the strategic separation between the core AI processing capabilities and the specialized functionalities provided by plugins. This separation allows the generative AI assistant service 104 to maintain a broad and dynamically updating range of capabilities, ensuring that the system can adapt to new challenges, preferences, and information domains, thereby enhancing the overall user experience and the service's utility over time.

The text passage retrieval service 108 or other retrieval service allows the generative AI assistant service 104 to remain up-to-date and capable of utilizing the latest plugins, even before the LLM of the LLM service 110 has been retrained to include information about these new additions. This is achieved through the indexing of information related to new plugins by the text passage retrieval service 108 or other retrieval service in the multi-tenant provider network 102. When a new plugin is installed, detailed descriptions, capabilities, and other relevant information about the plugin are indexed by the text passage retrieval service 108 or other retrieval service. This indexing process makes the information about the new plugin immediately searchable and retrievable within the multi-tenant provider network 102.

The dialog manager 106, upon receiving the current user input 122, uses the text passage retrieval service 108 or other retrieval service in the multi-tenant provider network 102 to find relevant information and resources that can assist in handling the current user input 122. Since the retrieval service indexes information about new plugins, the dialog manager 106 can retrieve these details even if the LLM of the LLM service 110 has not yet been updated to directly recognize or integrate these plugins into its responses. This mechanism allows the system to leverage the latest plugins by using the retrieval service as an intermediary information layer that supplements the LLM's knowledge base. Consequently, the system can dynamically adapt to include new functionalities and expertise areas brought by new plugins, enhancing its responsiveness and accuracy in addressing user queries.

This approach underscores the system's flexibility and the synergy between its components—the dialog manager 106, the text passage retrieval service 108 or other retrieval service, and the LLM—enabling a continuous and seamless evolution of the generative AI assistant service 104's capabilities. By indexing new plugins in this manner, the generative AI assistant service 104 can maintain a high level of relevance and utility, even as it awaits the next cycle of LLM retraining, ensuring that users benefit from the most current knowledge and capabilities available.

In the context provided by the claim, the approach to selecting a set of candidate plugins for the generative AI assistant service is designed to be flexible, accommodating both fixed or predetermined sets of plugins as well as varying sets that adapt to each user input. This flexibility is key to optimizing the service's responsiveness and relevance to the specific needs presented by different users or queries.

In an embodiment, a fixed or predetermined set of plugins is utilized. This approach can be beneficial in contexts where the range of expected queries is well-understood and relatively stable, such as within specific domains or for particular types of tasks. In these cases, the dialog manager 106 can consistently consult the same set of plugins, each known for its expertise in handling certain aspects of the domain or task types. This ensures that the system efficiently leverages specialized knowledge and capabilities to provide accurate and relevant responses.

Conversely, in an embodiment, the set of candidate plugins varies from user input to user input, offering a dynamic and tailored response mechanism. This variation allows dialog manager 106 to select candidate plugins based on the specific context, content, or intent of each user input, making the system highly adaptable and capable of addressing a wide and diverse range of queries. By analyzing the current user input, possibly in conjunction with the LLM's understanding of the query's nuances, the dialog manager 106 can identify the most relevant plugins for that situation, drawing from the entire pool of available plugins. This ensures that the most appropriate resources are utilized for each query, enhancing the accuracy and effectiveness of the service.

In an embodiment, a dual approach is used—employing both fixed sets of plugins for certain contexts and dynamic selection for others—enables the generative AI assistant service 104 to balance efficiency with adaptability. It can provide consistent, expert responses in well-defined areas while remaining flexible enough to address novel or complex queries effectively, thereby maximizing the service's utility and user satisfaction across a broad spectrum of interactions.

The user-agent conversation 118 is the interactive dialogue between an end-user and the generative artificial intelligence (AI) assistant, facilitated through the client interface. This conversation represents the primary mode of interaction within the system, where users express their queries, instructions, or requests in natural language or other form, and the AI assistant, leveraging its dialog manager and an array of plugins, generates responses that are conveyed back to the user. The conversation is designed to mimic human-like exchanges, providing a seamless and intuitive experience for the user.

The process begins with the user submitting the current user input 122 via client 114, which could be a text-based interface, voice command, or another form of input depending on the client 114's design. This current user input 122 is then transmitted through intermediate network 112 to the multi-tenant provider network 102, where it is received by the dialog manager 106. The dialog manager 106, utilizing its integration with the LLM service 110 and a system for retrieving relevant text passages and selecting appropriate plugins, crafts the agent response 136. This agent response 136 is tailored to the current user input 122, drawing on the extensive knowledge base and specialized capabilities of the AI system to provide informative, accurate, and contextually appropriate answers or actions.

The user-agent conversation 118 thus constitutes a dynamic and interactive exchange, where the AI assistant not only responds to direct queries but also has the potential to maintain context over the course of the conversation, adapt its responses based on user feedback, and even anticipate user needs to some extent. This creates an engaging and user-friendly environment, enabling users to interact with the AI system as they would with a human assistant, but with the added benefits of the AI's vast knowledge base, rapid processing capabilities, and availability across a wide range of domains and tasks.

A conversation history 120 of the user-agent conversation 118 is a comprehensive record of some or all previous exchanges between the user and the generative AI assistant, distinct from the current user input 122. While the current user input 122 represents the latest question, command, or message provided by the user at a specific moment in the interaction, the conversation history 120 encompasses some or all prior communications that have occurred during the session. This conversation history 120 includes both the questions or inputs submitted by the user and the responses generated by the AI assistant, providing a chronological account of the dialogue.

The conversation history 120 enables the AI assistant to maintain context and continuity over the course of the interaction. By referencing the conversation history 120, the dialog manager 106 and the underlying AI systems, such as the LLM of the LLM service 110, can better understand the context of the current user input 122, interpret it more accurately, and generate responses (e.g., text completion 130 and agent response 136) that are coherent and relevant within the broader narrative of the conversation 118. This capability is useful for handling complex queries that require an understanding of the dialogue's progression, such as follow-up questions, clarifications, or related topics introduced by the user.

The distinction between the current user input 122 and the conversation history 120 allows the AI assistant to dynamically adapt its responses based on the evolving context of the dialogue, rather than treating each input in isolation. This approach enhances the user experience by providing a more natural, conversational interaction with the AI, where the system's responses are informed by a deep understanding of the user's needs, preferences, and the conversational trajectory.

The current user input 122 refers to the most recent query, command, or message submitted by the user to the generative artificial intelligence (AI) assistant through the client interface. This input is a focal point for the AI system at any given moment in user-agent conversation 118, serving as the immediate stimulus for the system's processing and response generation activities. When received, the current user input 122 is transmitted via the intermediate network 112 to the dialog manager 106 within the multi-tenant provider network 102. The dialog manager 106, a core component of the AI assistant service, plays a useful role in interpreting this input 122, using it as the basis for several subsequent actions.

Firstly, the dialog manager 106 leverages the current user input 122 to formulate the text passage search query 124, which is used to retrieve relevant information from the text passage retrieval service 108. This step ensures that the agent response 136 generated by the AI system is informed by the most relevant and current data available. Following this, the dialog manager 106 constructs the contextual LLM text prompt 128, incorporating the retrieved set of text passages 126, characterizations of candidate generative AI assistant plugins, and the current user input 122 itself or a text representation thereof. This comprehensive LLM text prompt 128 is then sent to the LLM service 110 for processing, with the aim of generating the text completion 130 that indicates the most suitable plugin to handle the current user input 122 based on the context and content of the input.

The current user input 122 thus acts as a catalyst for the entire response generation process, from the initial retrieval of relevant information to the selection of an appropriate plugin and the crafting of the tailored agent response 136. It is the point of engagement where the user's needs or inquiries are directly communicated to the AI system, setting the direction for the system's immediate actions, and influencing the nature of the user-agent conversation 118.

The current user input 122 is described as the latest input provided by the user to the generative artificial intelligence (AI) assistant, which is useful for driving the conversation forward. While this current user input 122 is often text-based, reflecting questions, commands, or messages typed by the user, the system is also designed to accommodate "media input," such as voice recordings, images, or videos. This inclusivity towards different forms of user input ensures that the AI assistant service can cater to a wide range of user preferences and interaction modes, enhancing accessibility and user experience.

When the current user input 122 consists of media rather than text, the system employs a media-to-text conversion system to translate or convert this media input into text format. This conversion is useful because the underlying AI technologies, including the dialog manager 106 and the LLM service 110, may operate on textual data. For instance, a voice command or question recorded by the user is transcribed into text, images could be analyzed for text or relevant content descriptions, and videos could be processed to extract spoken words or relevant textual descriptions. This text is then treated as the current user input 122, processed through the same pipeline as direct text inputs-beginning with its reception by the dialog manager 106, followed by the retrieval of relevant information, and culminating in the generation of the appropriate agent response 136.

This capability to handle media inputs through conversion to text ensures that the generative AI assistant service 104 is versatile and adaptable, capable of serving users across different contexts and preferences. It highlights the system's commitment to providing a seamless and inclusive user experience, where the method of input does not limit the quality or efficiency of the service provided. This approach also reflects the technological sophistication of the AI assistant service, integrating media processing and natural language understanding to maintain a high level of engagement and responsiveness to user needs.

FIG. 1 illustrates an example method for enhanced plugin selection in conversational artificial intelligence systems through contextual large language model prompts. The steps of the example method are depicted by numbered circles overlaying or accompanying directed arrows. The numbers in the circles are merely convenient names or labels for different steps of the method and are not intended to require a rank or ordering of the steps. The direction of a directed arrow represents a direction of data flow between the connected components but not necessarily the exclusive direction.

At step 1, the current user input 122 is received from the client 114 as an initial point of interaction between the end-user and the generative AI assistant service 104. This step involves client 114 (which could be a web interface, a mobile application, or any user-facing platform capable of facilitating the user-agent conversation 118) capturing the current user input 122 (e.g., query, command, or message). The captured current user input 112 is then transmitted to the dialog manager 106 of the generative AI assistant service 104 via the intermediate network 112. The reception of the current user input 122 by the dialog manager 106 marks the beginning of a set of actions undertaken by the AI system to process the current user input 122.

At step 2, after the dialog manager 106 receives the current user input 122 via the intermediate network 112, it retrieves the set of text passages 126 relevant to the current user input 122. The process begins with dialog manager 106 formulating the text passage search query 124, which either directly incorporates the current user input 122 or is generated based on the analysis of the current user input 122. The dialog manager 106 functions to understand and contextualize the current user input 122, transforming it into the text passage search query 124 that can be effectively processed by the text passage retrieval service 108.

The text passage retrieval service 108 functions to access and search through a vast array of repository of text data to find information (text passages) that matches the text passage search query 124. The text passage retrieval service 108 operates a search algorithm that can parse the intent and content of the text passage search query 124, identify and retrieve text passages that are most relevant to the text passage search query 124. The selected set of text passages 126 are then compiled and sent back to the dialog manager 106.

At step 3, the dialog manager 106 generates the contextual LLM text prompt 128. The contextual LLM text prompt 128 is a precisely crafted request that integrates several components: the set of text passages 126 retrieved from the text passage retrieval service 108, a set of text characterizations describing the capabilities and expertise areas of a set of candidate generative AI assistant plugins, and a current user text input. The current user text input itself may either be the direct current user input 122 as received or a version that has been processed or generated based on the current user input 122 to better suit the requirements of the contextual LLM text prompt 128.

The inclusion of the relevant set of text passages 126 in the contextual LLM text prompt 128 provides context and factual grounding for the LLM service 110's processing, enhancing its ability to generate an accurate and contextually relevant text completion 130. The text characterizations of the candidate plugins are useful for informing the LLM of the different plugin functionalities available within the generate AI assistant service 104, enabling it to make informed decisions about which plugin might best address the current user input 122. Finally, the incorporation of the current user text input ensures that the current user input 122's intent and query are considered by the LLM when selecting a plugin from among the set of candidate plugins. By crafting a comprehensive LLM text prompt 128 that combines user input, contextual information, and insights into the AI assistant's capabilities, the dialog manager 106 facilitates a targeted and informed analysis by the LLM of the LLM service 110.

In an embodiment of the method, dialog manager 106 enhances its procedure for selecting the most suitable generative AI assistant plugin by employing a dedicated text characterization retrieval process. After receiving the current user input 122 and before generating the contextual LLM text prompt 128, the dialog manager 106 initiates an addition query step focused on obtaining precise information about the capabilities of available plugins. This is achieved by sending a text characterization search query, formulated based on the current user input 122, to a generative AI assistant plugin text characterization retrieval service 138 within the multi-tenant provider network 102.

The text characterization search query is generated by the dialog manger 106 to capture the essence of the current user input 122, whereby by directly incorporate the current user input 122 or by generating a derived query that accurately reflects the user's needs and intentions. The generative AI assistant plugin text characterization retrieval service 138 is configured to understand and catalog (index) the text characterizations of various generative AI assistant plugins, process the text characterization search query to identify and return a set of text characterizations that accurately describe the function, expertise, and potential relevance of the generative AI assistant plugins in relation to the current user input 122.

Upon receiving these text characterizations, the dialog manager 106 gains a deeper insight into which plugins, of all available plugins, might be most effective for responding to the specific current user input 122. This enriched information allows the dialog manager 106 to make a more informed decision when incorporating these characterizations into the contextual LLM text prompt 128 and the LLM of the LLM service 110 to make a more informed decision when selecting the most appropriate plugin. The process ensures that the selection of the plugin, as indicated by the text completion 130 generated by the LLM service 110, is based on a comprehensive understanding of both the current user input 122 and the capabilities of the candidate plugins.

In an embodiment, the dialog manager 106 undertakes a comprehensive evaluation of each candidate generative artificial intelligence (AI) assistant plugin to enhance the decision-making process for responding to the current user input 122. This evaluation involves querying a specialized retrieval service for positive example rewrites that showcase the effectiveness and relevance of each plugin in handling queries like the current user input 122. The dialog manager 106 formulates a positive example rewrite search query, either directly based on the current user input 122 or through a derived query that accurately reflects the current user input 122 and sends this query to a generative AI assistant plugin positive example rewrite retrieval service 140 for every candidate plugin.

Upon receiving a set of one or more positive example rewrites for each candidate plugin, the dialog manager 106 gains access to real-world instances where these plugins have successfully addressed queries or tasks. These examples serve as practical demonstrations of the plugins' capabilities, providing a tangible basis for the LLM of the LLM service 110 to assess their suitability for the current user input 122. The inclusion of these positive example rewrites in the text characterizations of the candidate plugins in the contextual LLM text prompt 128 by the dialog manager 106 enriches the decision-making data available to the LLM of the LLM service 110. This enriched data set allows for a more nuanced and evidence-based plugin selection process, wherein the LLM of the LLM service 110 can evaluate the demonstrated effectiveness of each plugin in contexts that are closely related to the current user input 122.

By incorporating these positive example rewrites into the plugin selection process, this embodiment enhances the LLM's ability to make informed, contextually grounded decisions. This methodological enhancement ensures that the selection of the most appropriate plugin is not only based on theoretical capabilities or general text characterizations but is also informed by empirical evidence of each plugin's performance in relevant scenarios. Consequently, this approach leads to more accurate, effective, and user-centric responses, thereby improving the overall user experience with the AI assistant service.

At step 4 of the method, the dialog manager 106 sends the contextual LLM text prompt 128 to the LLM service 110 for completion. After the dialog manager 106 has compiled the contextual LLM text prompt 128—which includes the set of text passages 126 relevant to the current user input 122, a set of text characterizations of the candidate generative AI assistant plugins, and the current user text input (either directly taken from the user or generated based on the user's input)—it proceeds to engage with the LLM service 110. This LLM service 110 houses the computational and neural network capabilities necessary to process complex language-based tasks and generate coherent, contextually relevant text outputs.

The sending of the contextual LLM text prompt 128 to the LLM service 110 initiates an interaction wherein the LLM analyzes the provided LLM text prompt 128, leveraging its extensive training on vast datasets to understand and interpret the nuances and requirements embedded within the contextual LLM text prompt 128. This includes understanding the current user input 122 as conveyed through the current user text input of the contextual LLM text prompt 128, the context provided by the set of text passages 126, and the capabilities and potential relevance of the candidate plugins as described in their text characterizations.

The LLM service 110 then processes this information to generate the text completion 130. This text completion 130 is tailored to indicate the most suitable generative AI assistant plugin (from the set of candidates) that is best equipped to handle the current user input 122. This step leverages the LLM's ability to synthesize information from diverse sources and apply its understanding of language, context, and the specific functionalities of available plugins to make an informed recommendation. Thus, sending the contextual LLM text prompt 128 to the LLM service 110 for completion bridges the initial analysis of the current user input 122 with the strategic selection of an AI assistant plugin capable of providing an accurate and helpful response.

The LLM within the LLM service 110 possesses the capability to analyze and interpret the contextual LLM text prompt 128, which includes the current user text input, and determine the relevance and applicability of the candidate generative AI assistant plugins to the query at hand. In an embodiment, this advanced level of analysis allows the LLM to discern when the current user input 122 falls "out-of-scope," meaning it does not correspond to the intended functions or knowledge domains of any of the candidate plugins available within the AI assistant service or specified in the contextual LLM text prompt 128.

The determination of input as "out-of-scope" involves the LLM leveraging its extensive training on diverse datasets, enabling it to understand a wide array of topics, contexts, and user intents. When the LLM processes the contextual LLM text prompt 128, it evaluates the current user text input against the text characterizations of the candidate plugins, looking for a match or a close correlation between the current user input 122 and the described capabilities of the plugins. If the LLM finds that the current user input 122 does not align with the expertise areas, functions, or intended use cases of any candidate plugins, it can conclude that the current user input 122 is out-of-scope.

This conclusion might be reached through several indicators, such as a lack of relevant keywords or concepts in the current user input 122 that match the plugin descriptions, or the LLM's recognition of the current user input 122 as pertaining to a topic or request that is fundamentally outside the designed service scope of the AI assistant. In such cases, the text completion 130 to the dialog manager may indicate that no suitable plugin has been identified, suggesting that the query does not intend to invoke the service's functionalities as defined by the available plugins.

This ability to identify out-of-scope queries is useful for maintaining the relevance and efficiency of the AI assistant service, ensuring that the system focuses its resources and responses on inquiries that fall within its domain of expertise. It also provides an opportunity for the generative AI assistant service 104 to handle such queries appropriately, whether by informing the user that their request cannot be fulfilled, offering general assistance, or redirecting the user to alternative resources.

In an embodiment, incorporating a special text characterization for an "out-of-scope" plugin within the set of text characterizations included in the contextual LLM text prompt 128 represents a strategic enhancement to facilitate the identification of queries that fall outside the intended service scope of the generative artificial intelligence (AI) assistant. This special text characterization is designed to represent scenarios or inquiries that do not align with the functionalities or knowledge domains of any existing candidate plugins. By including this characterization among those of the candidate plugins in the contextual LLM text prompt 128, the dialog manager 106 effectively equips the LLM of the LLM service 110 with a criterion for recognizing and classifying out-of-scope user inputs.

When the LLM processes the contextual LLM text prompt 128, it assesses the current user input 122 not only against the specific capabilities and expertise areas of the candidate plugins but also considering the "out-of-scope" characterization. This process allows the LLM to determine whether the current user input 122 matches known service capabilities or if it instead aligns with the out-of-scope criteria. If the LLM concludes that the current user input 122 best matches the out-of-scope characterization, it indicates in the text completion 130 that the current user input 112 does not intend to invoke the functionalities of any available plugins and is therefore considered out-of-scope.

This approach offers a systematic method for handling queries that are beyond the AI service's designed range of responses, ensuring that the system can acknowledge and appropriately address such inquiries. For instance, the LLM might generate the text completion 130 suggesting that the current user input 122 does not match the service capabilities, prompting the dialog manager 106 to communicate this status back to the user in the agent response 136. This could involve informing the user that their request cannot be processed within the current framework of the generative AI assistant service 104 and, if possible, providing guidance on where they might seek the needed information or assistance.

In this embodiment, one of the candidate generative AI assistant plugins characterized in the contextual LLM text prompt is an "out-of-scope" candidate generative AI assistant plugin. Incorporating this "out-of-scope" plugin characterization into the contextual LLM text prompt 128 thus enhances the system's ability to manage user expectations and maintain a high level of service quality, even when faced with queries that it cannot directly address.

In an embodiment, incorporating a set of one or more positive example rewrites for each candidate plugin, including an "out-of-scope" plugin, into the contextual LLM text prompt 128 significantly enhances the LLM's ability to discern the relevance of the current user input 122 to the generative AI assistant service 104's capabilities. These positive example rewrites serve as practical illustrations of each plugin's successful application, including how the "out-of-scope" plugin categorizes queries that do not align with any specific generative AI assistant service 104 offerings. By integrating these examples into the contextual LLM text prompt 128, the dialog manager provides the LLM with concrete instances of interaction scenarios, equipping it with a richer context for evaluation.

This detailed inclusion aids the LLM in making more nuanced decisions about the nature of the current user input 122. For candidate plugins that offer specific functionalities, the positive example rewrites showcase the types of queries they are designed to handle, highlighting their scope and limitations. Conversely, the examples associated with the "out-of-scope" plugin demonstrate instances where previous queries were identified as falling outside the generative AI assistant service 104's operational domain. This comparative analysis enables the LLM to match the current user input 122 against a broad spectrum of interaction patterns, from highly relevant to completely out-of-scope scenarios.

When the LLM processes the contextual LLM text prompt 128, it analyzes the current user input 122 considering these examples, assessing whether the input closely aligns with the scenarios depicted in the positive examples of the candidate plugins or if it mirrors those associated with the "out-of-scope" plugin. If the current user input 122 matches more closely with the "out-of-scope" examples, the LLM can determine that the query does not intend to invoke any specific functionalities provided by the generative AI assistant service 104 and is thus out-of-scope. Conversely, if the current user input 122 aligns with the positive examples of a particular candidate plugin, the LLM identifies it as within scope, relevant to the generative AI assistant service 104's offerings.

This methodological enhancement leverages the LLM's sophisticated processing capabilities to refine the system's response mechanism, ensuring that user queries are accurately categorized and addressed. By providing the LLM with a spectrum of positive example rewrites, including those that delineate the boundaries of the generative AI assistant service 104's capabilities, the system is better equipped to manage user inquiries efficiently, ensuring that responses are both pertinent and informative, whether addressing specific requests or guiding users regarding out-of-scope queries.

At step 5, the text completion 130 to the contextual LLM text prompt 128 is received by the dialog manager 106. This text completion 130 is generated by the LLM of the LLM service 110, which has been tasked with processing the contextual LLM text prompt 128. The text completion 130 provided by the LLM service 110 specifically identifies which of the candidate plugins is best suited to address the user's query based on the input and context provided.

The significance of this step lies in the LLM's ability to synthesize the information contained within the contextual LLM text prompt 128, apply its vast training and understanding of language and context, and make an informed recommendation. The LLM evaluates the nuances of the current user input 122 as represented in the contextual LLM text prompt 128, the information gleaned from the set of text passages 126, and the capabilities and specialties of the candidate plugins as described by their characterizations. Based on this comprehensive analysis, the LLM generates the text completion 130 that essentially serves as a directive for the dialog manager 106, indicating the plugin that is most likely to provide an accurate, relevant, and effective response to the current user input 122.

The contextual LLM text prompt 128 sent to the LLM service 110 includes, among its various components, characterizations of candidate generative AI assistant plugins that are designed to address specific types of user queries within the multi-tenant provider network environment 100. In an embodiment, this set of candidate plugins may also include a special "out-of-scope" plugin, which is characterized not by a domain of knowledge or a specific set of functionalities but by its role in identifying queries that fall outside the operational scope of the generative AI assistant service 104. The inclusion of an "out-of-scope" plugin among the candidates is a proactive measure to handle cases where the current user input 122 does not match any of the generative AI assistant service 104's intended functions or areas of expertise.

When the LLM processes the contextual LLM text prompt 128 and generates the text completion 130, its analysis is based on the provided information, including the relevance of the user's query to the described capabilities of the candidate plugins. If, through its analysis, the LLM determines that the user's input does not align with the capabilities or knowledge areas of any specific plugin but instead matches the characterization of the "out-of-scope" plugin, it will indicate this plugin in its text completion 130. This outcome signifies that the LLM has identified the query as being outside the predefined service parameters-essentially, a type of request that the generative AI assistant service 104 is not designed to fulfill.

The identification of the "out-of-scope" plugin as the plugin by the text completion 130 generated by the LLM allows the dialog manager 106 to recognize that the current user input 122 cannot be adequately addressed by the available plugins due to its nature or subject matter. Consequently, the dialog manager 106 can then proceed to generate the agent response 136 that appropriately communicates the query's out-of-scope status to the user. This might involve providing a polite notification that the query cannot be processed within the current service framework, along with possible suggestions for alternative actions or resources.

This mechanism ensures that the generative AI assistant service 104 maintains a high level of user engagement and satisfaction, even when it encounters queries it is not equipped to handle. By effectively identifying and managing out-of-scope queries, the generative AI assistant service 104 can provide clear and helpful communication to users, reinforcing the system's reliability and user-centric approach.

At step 6, the dialog manager 106 sends the plugin query 132 to the generative AI assistant plugin (e.g., plugin 116-2) identified by the LLM completion 130. Once the dialog manager 106 receives the text completion 130 from the LLM service 110, which specifically indicates the most suitable candidate plugin for handling the current user input 122 (or indicates that the current user input 122 is out-of-scope), it proceeds to engage directly with the identified plugin. This engagement is facilitated through the submission of the plugin query 132, which effectively communicates the essence of the user's request to the selected plugin.

This plugin query 132 represents a targeted request for information or action based on the user's input and the context provided by the initial steps of the process, including the analysis performed by the LLM. The plugin query 132 is crafted to convey the necessary details to the plugin, enabling it to understand the task at hand and apply its specialized capabilities or knowledge to generate an appropriate response.

In an embodiment, the process is further refined by allowing the text completion 130 generated by the LLM of the LLM service 110 to not only identify the most appropriate generative AI assistant plugin for handling the current user input 122 but also to directly generate the specific plugin query 132 that should be sent to the selected plugin. This capability enhances the efficiency and precision of the generative AI assistant service 104's response generation process. In this scenario, the LLM leverages the comprehensive information and instructions contained within the contextual LLM text prompt 128—comprising the relevant set of text passages 126, text characterizations of candidate plugins, and the current user input 122 or its derivative—to not just pinpoint the best-suited plugin but also to articulate the exact query that encapsulates the user's request in a form that the identified plugin can most effectively respond to.

This approach allows the dialog manager 106 to act on the LLM text completion 130 with a higher degree of specificity, as the completion itself includes the ready-to-use plugin query 132 tailored for the identified plugin. This means that the dialog manager 106, instead of crafting the plugin query 132 based on the text completion 130's plugin indication, can directly forward the generated plugin query 132 to the indicated plugin.

In an embodiment, the contextual LLM text prompt 128 includes positive example rewrites that characterize each candidate generative AI assistant. These positive example rewrites are essentially curated sets of user input and plugin query pairs that serve as illustrative examples of successful interactions facilitated by the respective plugins. By showcasing how specific types of user queries have been effectively addressed by each plugin in the past, these examples provide concrete instances of both the user inputs and the corresponding plugin queries submitted to the plugins.

This repository of example conversations serves as a useful resource for the LLM when it processes contextual LLM text prompt 128, which includes the current user input alongside other contextual information. The presence of example conversations enables the LLM to better understand the nuances of translating user inputs into specific plugin queries, essentially learning from past instances of successful query formulations and responses. By analyzing these examples, the LLM can identify patterns, keywords, or contextual cues that indicate how a similar current user input should be transformed into a plugin query that accurately reflects the user's intent and is likely to elicit a relevant and precise response from the selected plugin.

Consequently, when the LLM generates the text completion 130 that not only identifies the appropriate plugin but also includes a suggested plugin query, it does so with an informed understanding of the most effective way to communicate the user's request to the plugin, based on the positive example rewrites. This approach significantly enhances the efficiency and accuracy of the generative AI assistant service 104, ensuring that the generated plugin queries are well-crafted and aligned with the plugin's capabilities and previous successful interactions. Thus, the inclusion of positive example rewrites as part of the plugin characterizations allows the LLM to bridge the gap more effectively between user inputs and the specialized responses provided by the generative AI assistant service 104, leading to more coherent, contextually appropriate, and satisfying user-agent interactions.

At step 7, the dialog manager 106 receives plugin response 134 to the plugin query 132. After identifying the most appropriate plugin for the user's query—guided by the text completion 130 from the LLM service 110—the dialog manager 106 sends the plugin query 132 to this selected plugin, which is equipped with specialized knowledge or functionalities tailored to the context of the user's input. The reception of plugin response 134 marks the culmination of the plugin's processing and its attempt to provide a precise, informative answer or perform a specific task requested by the user.

At step 8, the dialog manager 106 generates the agent response 136 based on the plugin response 134. This stage represents the synthesis of the process, where the dialog manager 106 takes the substantive output provided by the selected plugin—tailored to address the user's specific query—and crafts it into a coherent, comprehensive response that is to be communicated back to the user. The plugin response 134, derived from the plugin's specialized knowledge or functionalities, is thus transformed into the agent response 136 that encapsulates the AI system's answer or solution to the user's request.

The dialog manager 106's role as the intermediary between the complex backend processes of the generative AI assistant service 104 and the user interface. It takes the technical or specialized content provided by the plugin and ensures that it is presented in a manner that is accessible, understandable, and useful to the user. This may involve contextualizing the plugin response 134, refining its language, or integrating it with additional information to enhance its clarity and relevance.

At step 9, the dialog manager 106 sends the agent response 136 to the client 114. After the dialog manager 106 has generated the agent response 136—crafted based on the plugin response 134 to the plugin query 132—this agent response 136 is transmitted back to the user through the client interface. This transmission occurs via the intermediate network 112.

Figure 15:
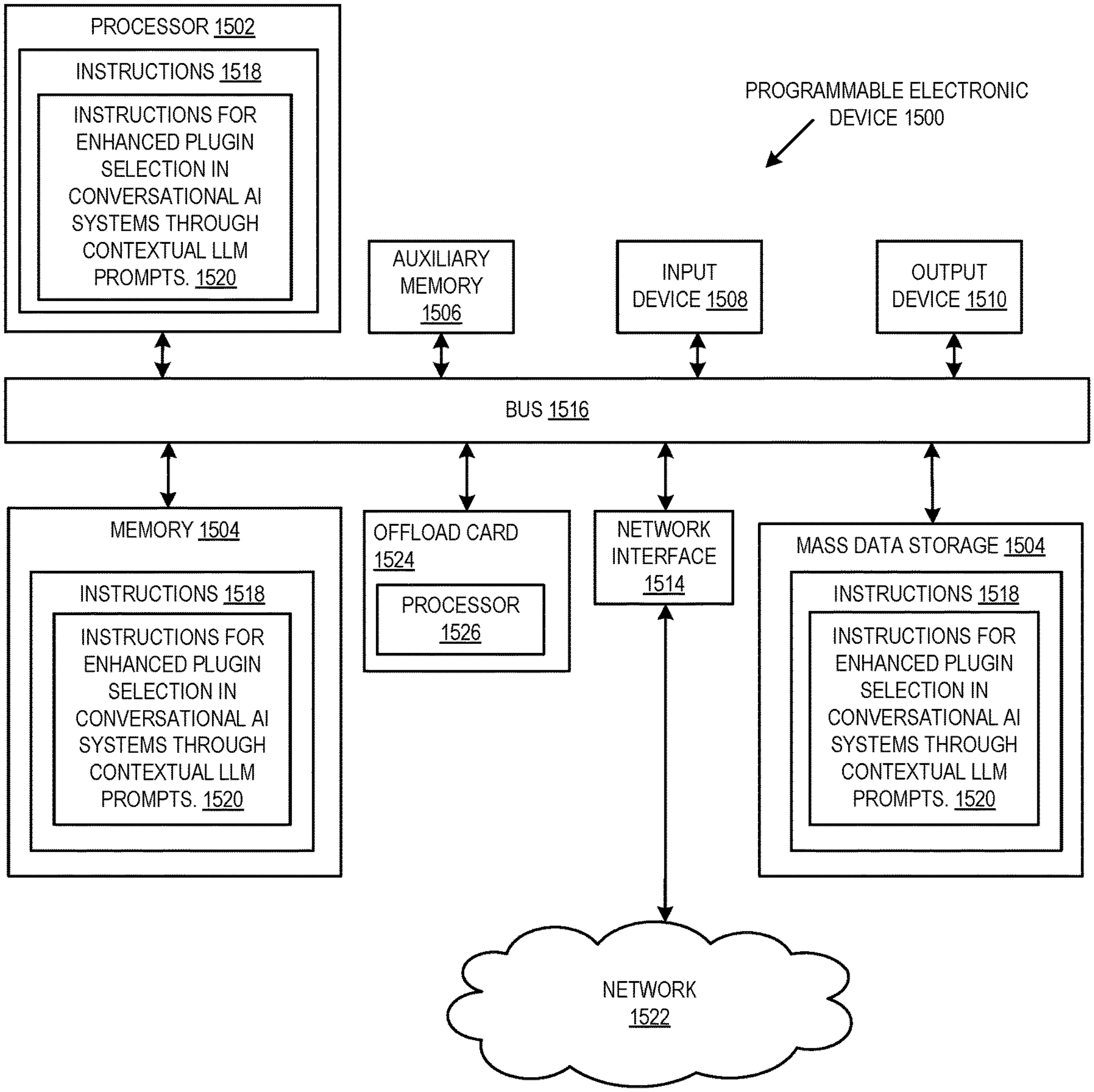
FIG. 15 illustrates an example of a programmable electronic device that processes and manipulates data to perform techniques disclosed herein for enhanced plugin selection in conversational artificial intelligence systems through contextual large language model prompts.

Various services and components of the multi-tenant provider network environment 100—encompassing the dialog manager 106, the text passage retrieval service 108, the LLM service 110, the generative AI assistant plugins, the generative AI assistant plugin text characterization retrieval service 138, and the generative AI assistant plugin positive example rewrite retrieval service 140—are implemented using one or more programmable electronic devices (e.g., programmable electronic device 1500 of FIG. 15). These devices are configured with software and algorithms that enable the execution of disclosed tasks.

Programmable electronic devices, ranging from servers and cloud-based computing resources to specialized hardware optimized for AI computations, provide the computational power necessary to process large volumes of data, run advanced machine learning models, and manage network communications. The dialog manager 106, for instance, operates on these devices to orchestrate the flow of information and queries between the client 114 and other services, ensuring efficient processing and response generation. Similarly, the text passage retrieval service 108 and the LLM service 110 utilize these devices to access vast databases of information or to apply complex language models to the task of understanding and generating human-like text, respectively.

The architecture of the multi-tenant provider network 102 is designed to leverage the capabilities of these programmable electronic devices, enabling distributed computing and storage solutions that enhance the system's performance and reliability. This setup allows for the deployment of microservices or containerized applications that can be scaled up or down based on real-time demand, ensuring that the generative AI assistant service 104 remains responsive and efficient across all user interactions.

Moreover, the programmability of these electronic devices means that the services can be continuously updated and improved. New AI models can be trained and deployed, algorithms can be optimized, and the overall system can evolve in response to emerging needs and technologies.

The seamless communication and interaction between the various services and components of the generative AI assistant service 104, the multi-tenant provider network 102, and within the multi-tenant provider network environment 100 are facilitated using application programming interfaces (APIs). APIs act as gateways or intermediaries that allow different software components to interact with each other programmatically, enabling the exchange of data and the execution of operations across the system's architecture without the need for direct user intervention.

For example, when the dialog manager 106 receives the current user input 122 from the client 114, it uses an API to send the current user input 122 or the text passage search query 124 derived from the current user input 122 to the text passage retrieval service 108, requesting relevant text passages based on the current user input 122 or the text passage search query 124. The text passage retrieval service 108, in turn, responds via its API, providing the relevant passages back to the dialog manager 106. This pattern of request and response is repeated across the system: the dialog manager 106 generates the contextual LLM text prompt 128 and sends it to the LLM service 110 using another API, which processes the contextual LLM text prompt 128 and returns the text completion 130 indicating the selected plugin. The dialog manager 106 then uses a specific API to communicate with the indicated plugin, sending the plugin query 132 and receiving the plugin response 134 to incorporate into the final agent response 136 sent back to the client 114.

APIs are useful for defining the specific ways in which these services can be accessed and used, detailing the methods for sending requests and the formats for receiving responses. They enable the modular architecture of the generative AI assistant service 104, the multi-tenant provider network 102, and the multi-tenant provider network environment 100, where each component, from the dialog manager 106 to the individual plugins 116, is developed and operates independently but is designed to work together seamlessly as part of the larger system. This modularity, supported by APIs, allows for the integration of new functionalities and updates to existing components without disrupting the overall service.

Figure 2:
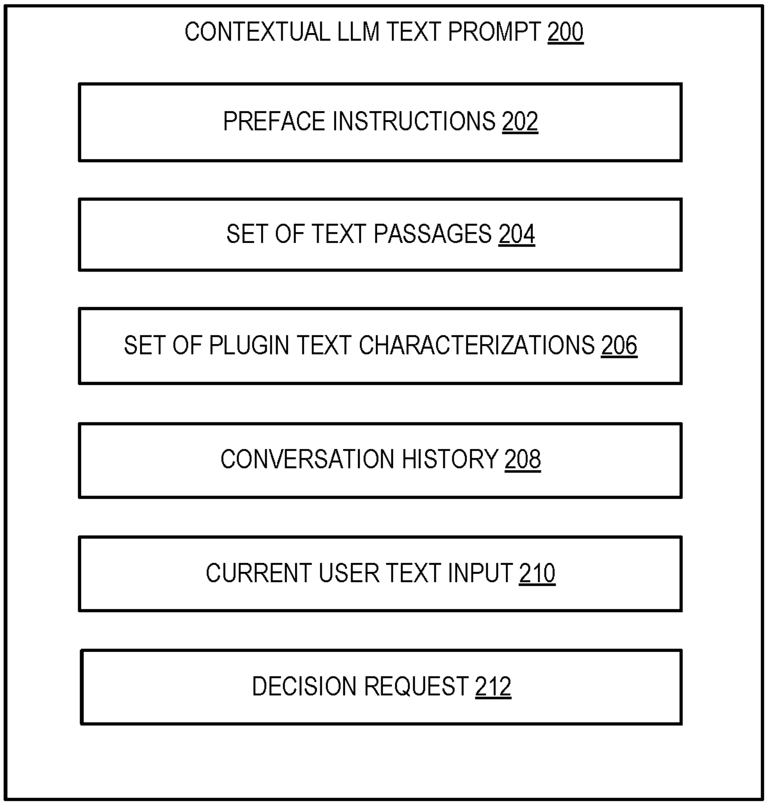
FIG. 2 illustrates an example of the high-level structure of a contextual LLM text prompt for enhanced plugin selection in conversational artificial intelligence systems through contextual large language model prompts.

FIG. 2 illustrates an example of the high-level structure of a contextual LLM text prompt 200. The contextual LLM text prompt 200 is composed of several sequential sections starting with preface instructions 202, followed by a set of text passages 204, followed a set of plugin text descriptions 206, followed by conversation history 208, followed by a current user text input 210, which is followed by a decision request 212.

The composition of the contextual LLM text prompt 200 is a strategic assembly of sections designed to optimize the LLM's understanding and processing of the user's query within the context of the generative artificial intelligence (AI) assistant service 104. Each section plays a role in guiding the LLM towards generating a precise and contextually appropriate text completion 130, which, in turn, aids in selecting the most suitable plugin for responding to the user's input.

Preface instructions 202 sets the stage for the LLM's processing by providing context about the nature of the task and any specific instructions or guidelines that should be followed. Preface instructions 202 might include directives on prioritizing certain types of information, understanding the intent behind the user's query, or applying specific criteria when evaluating the suitability of plugins. This prepares the LLM to approach the subsequent sections with a clear understanding of the goals and constraints of the task at hand.

The set of text passages 204 supplies the LLM with specific information or data pertinent to the user's query. This could involve definitions, explanations, or contextual information that enhances the LLM's ability to comprehend and address the query. By grounding the LLM's processing in relevant content, this section helps ensure that the generated completion is informed by accurate and useful information.

The set of plugin text characterizations 206 presents detailed descriptions of the candidate generative AI assistant plugins (including, possibly, the "out-of-context" plugin), highlighting their capabilities, areas of expertise, and potential applicability to various types of queries. Providing these characterizations enables the LLM to match the user's needs with the specific functionalities offered by the plugins, facilitating a more targeted and effective selection process.

The conversation history 208 within the contextual LLM text prompt 200 ensures that the LLM has access to the full context of the ongoing interaction, not just the current user input. This allows the LLM to consider previous exchanges, questions, and responses, which can be useful for understanding the user's intent, maintaining coherence across the conversation, and building upon the information previously provided.

The inclusion of the current user text input 210 represents the specific query or request the user is posing at this moment. This section is useful for focusing the LLM's processing on addressing the immediate needs or questions of the user, guiding the subsequent generation of a plugin query or decision.

The decision request 212 explicitly asks the LLM to apply its analysis of the preceding sections to make a recommendation or decision, for example, whether the user's query is out-of-scope and, if not, regarding which plugin is best suited to handle the user's query. This directs the LLM's completion towards a specific output goal, ensuring that the processing culminates in actionable guidance for the dialog manager 106.

By structuring the contextual LLM text prompt with these sections, the dialog manager 106 effectively leverages the LLM's capabilities to navigate the complex task of understanding user queries, accessing relevant information, and identifying the appropriate plugin response within the multi-tenant provider network environment 100.

Figure 3:
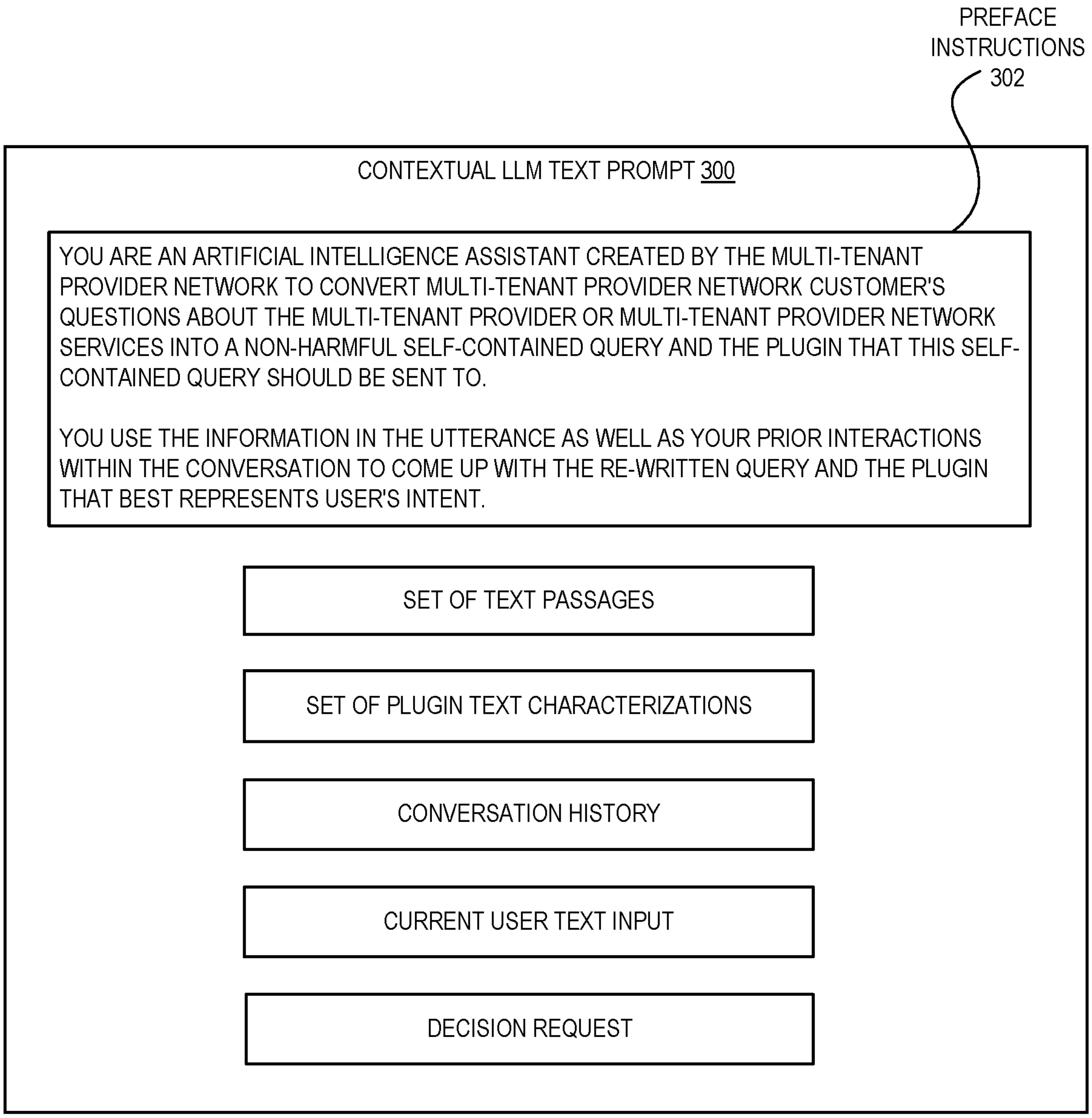
FIG. 3 illustrates an example of the high-level structure of preface instructions of a contextual LLM text prompt for enhanced plugin selection in conversational artificial intelligence systems through contextual large language model prompts.

FIG. 3 illustrates an example high-level structure of a contextual LLM text prompt 300 with an example of preface instructions 302. The example preface instructions 302 offer a clear directive to the LLM. The preface instructions 302 serve as a foundational guide, setting the operational parameters and objectives for the LLM as it processes the contextual LLM text prompt 300.

Specifically, the LLM is tasked with transforming customer questions related to the multi-tenant provider network 102 or its services into non-harmful, self-contained queries. Moreover, the LLM is responsible for determining the most appropriate plugin to which these queries should be directed, ensuring that the chosen plugin aligns with the user's intent as expressed in their question and within the context of the ongoing conversation.

Figure 4:
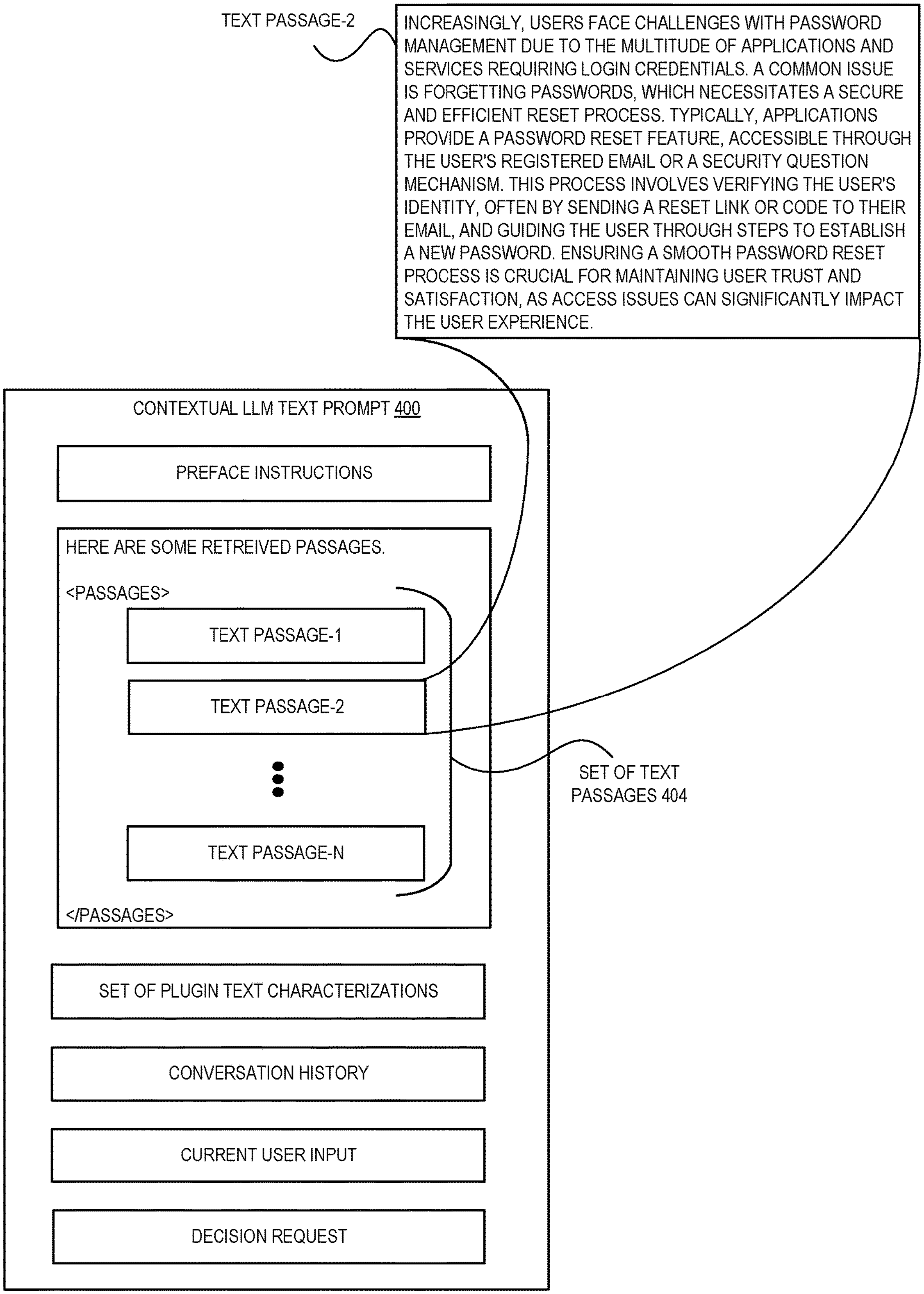
FIG. 4 illustrates an example of the high-level structure of a set of text passages of a contextual LLM text prompt for enhanced plugin selection in conversational artificial intelligence systems through contextual large language model prompts.

FIG. 4 illustrates an example high-level structure of a contextual LLM text prompt with an example set of text passages. An example of a text passage is provided as text passage 2. The number of the set of text passages 404 retrieved and subsequently included in the contextual LLM text prompt 400 can vary based on several factors. For example, the variation in the number of the set of text passages 404 included in the contextual LLM text prompt 400 can be attributed to the unique characteristics of each user's input, such as the query's subject matter, specificity, and the context within which it is posed. For instance, a broad or complex query may require the retrieval of a larger set of text passages to provide a comprehensive context, enabling the LLM to generate a well-informed response. Conversely, a more straightforward or narrowly focused query might necessitate fewer passages, as sufficient context can be provided with a more concise set of information.

Additionally, the dialog manager, which orchestrates the retrieval and compilation of the set of text passages 404 into the contextual LLM text prompt 400, may employ algorithms or heuristics designed to optimize the selection of passages based on length, relevance, recency, or other criteria. This process ensures that the volume of text included in the contextual LLM text prompt 400 is both manageable for the LLM to process efficiently and sufficiently informative to aid in generating accurate completions.

The adaptability in the number of the set of text passages 404 also reflects the system's capability to balance the need for comprehensive context with the constraints of processing capacity and response time. By dynamically adjusting the volume of information included in the contextual LLM text prompt 400, the dialog manager can enhance the efficiency of the LLM service, ensuring that the system remains responsive to the user's needs while maximizing the quality and relevance of the AI-generated responses.

A text passage (e.g., one of the set of text passages 404) can be understood as a logical or coherent section extracted from a broader text source, such as a book, web page, article, or other text-based materials. These passages are selected for their relevance to a specific query or topic and are characterized by their self-contained nature, meaning they offer a complete idea or concept that contributes meaningfully to the understanding of the subject at hand. The selection of a passage is guided by its ability to provide context, information, or insights that are pertinent to the user's query, ensuring that the information included in the contextual LLM text prompt 400 is directly applicable to the task of generating an accurate and contextually appropriate response.

The coherence of a text passage implies that it maintains a logical flow of ideas, arguments, or information, making it understandable and useful when considered in isolation from the rest of the source material. This coherence is useful for the passage to effectively inform the processing of the LLM and contribute to the generation of relevant responses by the AI system. Logical segmentation of text sources into passages allows for the extraction of specific sections that are most relevant to the user's query, avoiding the need to process the entire text source and thereby enhancing the efficiency and accuracy of the AI assistant's response generation process.

Figure 5:
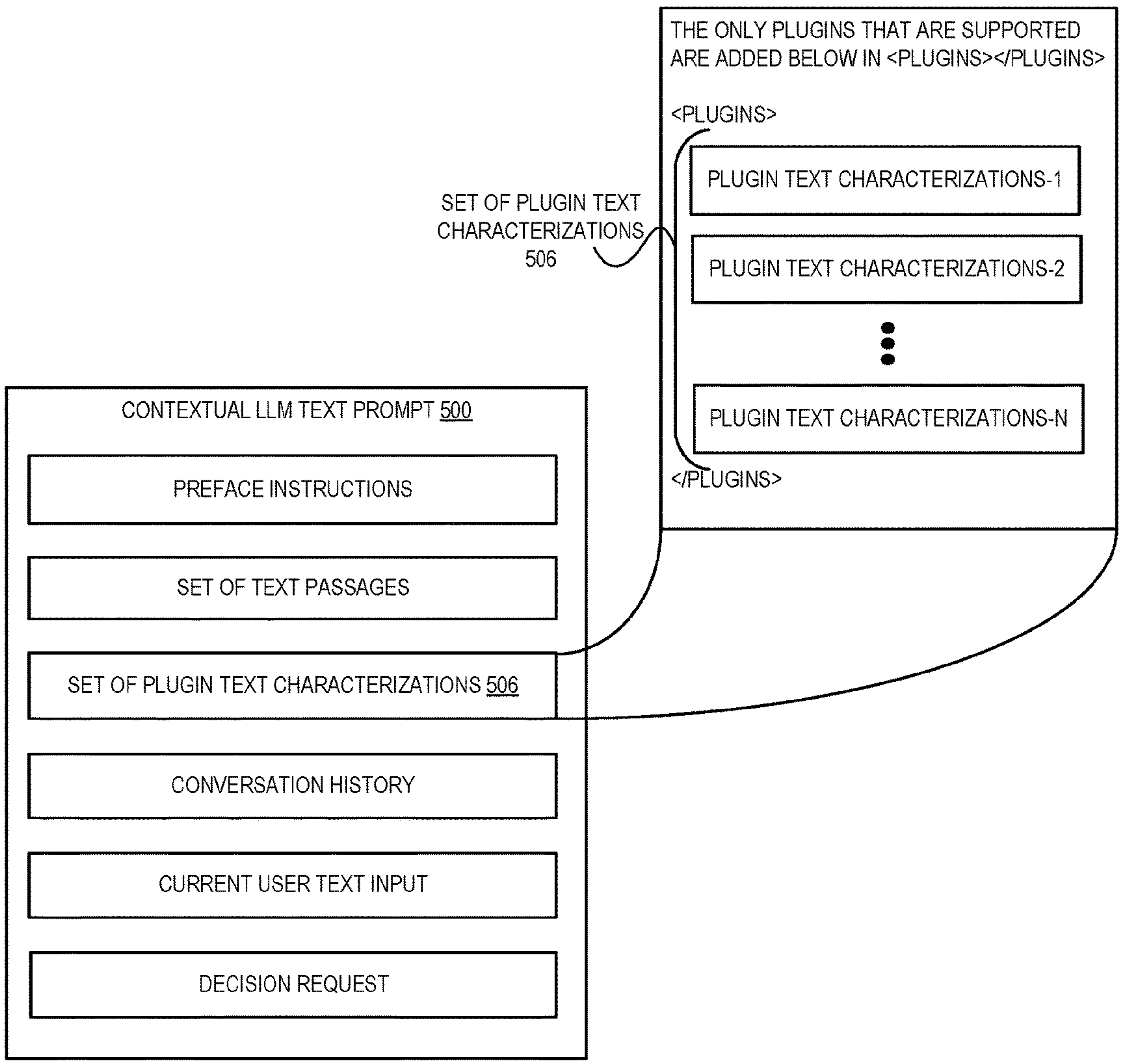
FIG. 5 illustrates an example of the high-level structure of a set of plugin text characterizations of a contextual LLM text prompt for enhanced plugin selection in conversational artificial intelligence systems through contextual large language model prompts.

FIG. 5 illustrates an example of the high-level structure of a set of plugin text characterizations 506 of a contextual LLM text prompt 500. The number of plugin text characterizations 506 and the number of candidate plugins included in the contextual LLM text prompt 500 can vary. This variability allows the system to tailor its processing and response generation to the specific demands of each user query, enhancing both the relevance and efficiency of the service.

The number of plugin text characterizations 506 can vary based on several factors, such as the complexity and scope of the user's query, the range of available plugins that could potentially address the query, and the dialog manager 106's strategy for selecting the most relevant plugins for consideration. For simpler queries with clear intent, dialog manager 106 may include fewer plugin text characterizations, focusing on a small set of highly relevant plugins. Conversely, for more complex or ambiguous queries, a broader selection of plugin characterizations may be included to explore a wider range of potential responses, ensuring that the system leverages its full capacity to identify the most appropriate plugin.

Similarly, the number of candidate plugins presented in the contextual LLM text prompt 500 reflects the system's assessment of which plugins are most likely to provide accurate and useful responses to the current user input. This assessment is influenced by the dialog manager 106's understanding of the plugins' capabilities, as informed by their text characterizations, and the specific requirements of the user's query. In cases where multiple plugins could potentially address different aspects of a query, the contextual LLM text prompt might include characterizations for a larger set of candidates. Alternatively, if the dialog manager 106 determines that one or a few plugins are particularly well-suited to the query, the number of candidate plugins included in the prompt may be smaller.

As described elsewhere herein, the set of candidate plugins can be determined based on retrieving a top-N most relevant plugin text characterizations from the generative AI assistant plugin text characterization retrieval service 138 that match a specified text characterization search query that is, or is generated based on, the current user input 122. The number N of text characterizations to retrieve for the current user input 112 can be fixed or predetermined or can be determined by the dialog manager 106 based on one or more factors such as those described above.

Figure 6:
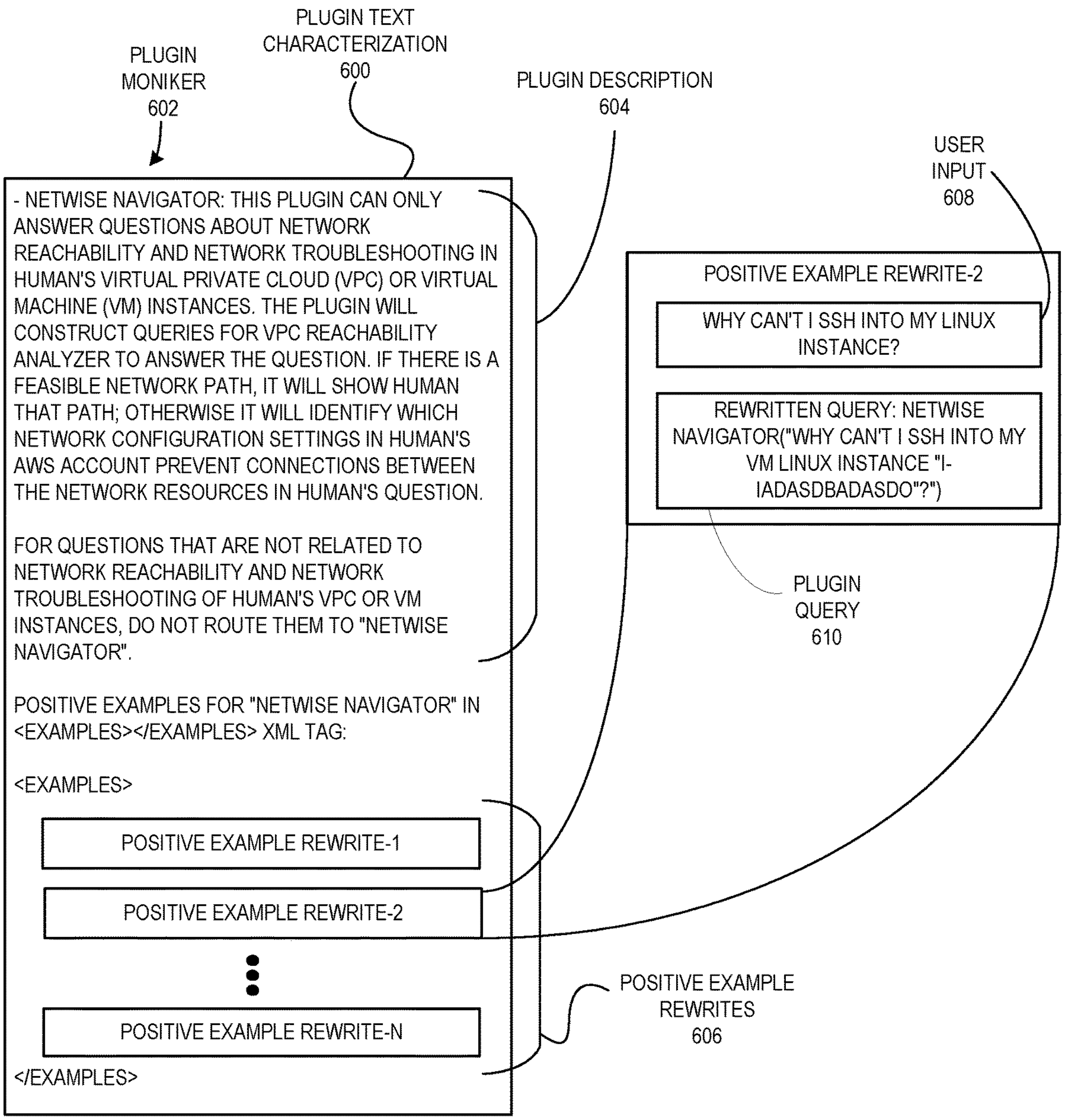
FIG. 6 illustrates an example of the high-level structure of a plugin text characterization of a contextual LLM text prompt for enhanced plugin selection in conversational artificial intelligence systems through contextual large language model prompts.

FIG. 6 illustrates an example of the high-level structure of a plugin text characterization 600 of a contextual LLM text prompt for enhanced plugin selection in conversational artificial intelligence systems through contextual large language model prompts. For example, plugin text characterization 600 can be one of the plugin text characterizations of the set of plugin text characterizations 506 depicted in FIG. 5. The example plugin text characterization 600 includes a plugin moniker 602, a plugin description 604, and a set of one or more positive example rewrites 606.

The text characterization 600 of a candidate generative AI assistant plugin is a detailed descriptor that informs the dialog manager 106 and the LLM service 110 about the plugin's capabilities, scope, and successful application scenarios. The text characterization 600 is composed of several elements: a plugin moniker 602, a plugin description 604, and a set of one or more positive example rewrites 606, each contributing to a comprehensive understanding of the plugin's functionality and its potential fit for addressing specific user queries within the multi-tenant provider network environment 100.

The plugin moniker 602 serves as a concise, identifiable name for the plugin, acting as a reference point for the dialog manager 106 and the LLM service 110. It encapsulates the essence of the plugin in a memorable and recognizable manner, facilitating quick identification and recall within the system's operational context. For example, the text competition 130 may identify or indicate the selected plugin by the plugin moniker 602.

The plugin description 604 provides an in-depth overview of the plugin's purpose, capabilities, and areas of expertise. It outlines what the plugin is designed to do, detailing the types of queries it can handle, the specific services it offers, and any unique features or technologies it employs. The plugin description 604 enables the dialog manager 106 and the LLM of the LLM service 110 to assess the plugin's relevance to the current user input 122, determining whether its capabilities align with the needs expressed in the user's query.

The inclusion of one or more positive example rewrites 606 is useful to illustrate to LLM how to translate (rewrite) user inputs to plugin queries for submission the plugin. Each example comprises a user input 608 and the corresponding plugin query 610 that is a rewrite of the user input 608, showcasing a positive example of rewriting the user input 608 to the plugin query 610 for the plugin. These examples guide the LLM in rewriting the current user text input to a plugin query that the dialog manager 106 can submit to the corresponding plugin.

Figure 7:
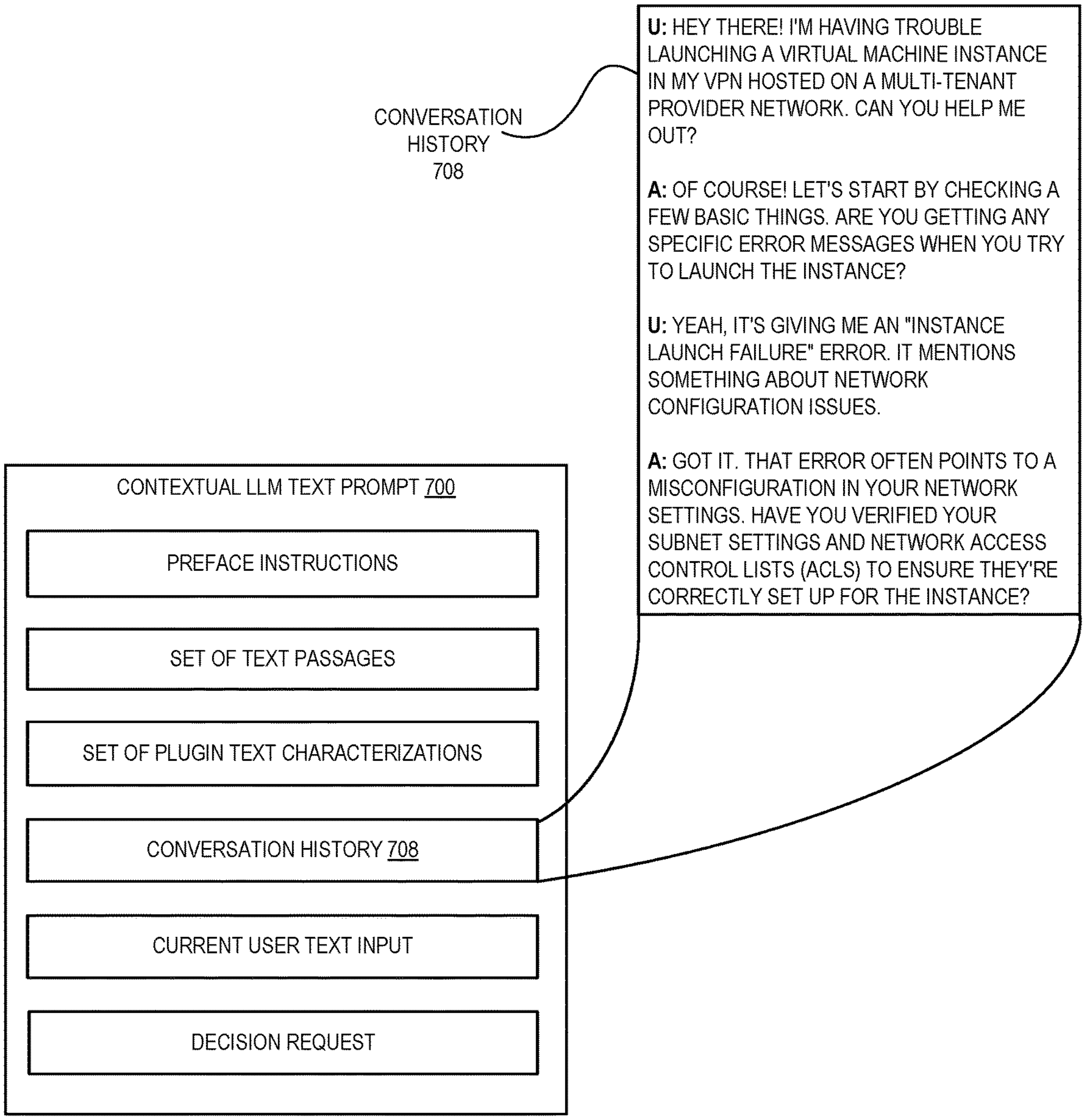
FIG. 7 illustrates an example of the high-level structure of a conversation history of a contextual LLM text prompt for enhanced plugin selection in conversational artificial intelligence systems through contextual large language model prompts.

FIG. 7 illustrates an example of the high-level structure of a conversation history 708 of a contextual LLM text prompt 700 for enhanced plugin selection in conversational artificial intelligence systems through contextual large language model prompts. The inclusion of the conversation history 708 within the contextual LLM text prompt 128 significantly enhances the LLM's ability to generate accurate and contextually relevant responses to user queries. The conversation history 708 encompasses some of or the entirety of the exchange between the user and the generative AI assistant up to the current point, including some or all previous user inputs and the corresponding agent responses. By incorporating this history into the contextual LLM text prompt 128, the dialog manager 106 provides the LLM with a comprehensive background of the ongoing interaction, enabling it to understand the context, nuances, and progression of the user-agent conversation 118.

Conversation history 708 is useful for several reasons. Firstly, it allows the LLM to grasp the full scope of the user's inquiry, including any clarifications, follow-up questions, or additional information provided by the user over the course of the interaction. This comprehensive view helps the LLM to interpret the current user input 122 more accurately, considering the broader context of the user's needs and intentions. Secondly, the conversation history 708 aids in maintaining coherence and continuity in the user-agent conversation 118. By referencing previous exchanges, the LLM can ensure that its generated text completion 130 to contextual LLM text prompt 128 are consistent with the information already provided to the user, building logically on the dialogue rather than repeating or contradicting earlier responses.

Moreover, the conversation history 708 can reveal patterns in the user's inquiries or preferences, which can be valuable for tailoring the text completion 130 to the user's specific expectations or requirements. For instance, if the user has expressed a preference for certain types of solutions or has repeatedly asked about a particular aspect of the multi-tenant provider network services, the LLM can use this information to prioritize relevant content in its text completion 130.

By feeding the conversation history 708 into the contextual LLM text prompt 128, the dialog manager 106 leverages the advanced processing capabilities of the LLM to ensure that each text completion 130 is not only informed by the immediate context of the current user input 122 but also enriched by the cumulative knowledge of some or all the entire user-agent conversation 118.

Figure 8:
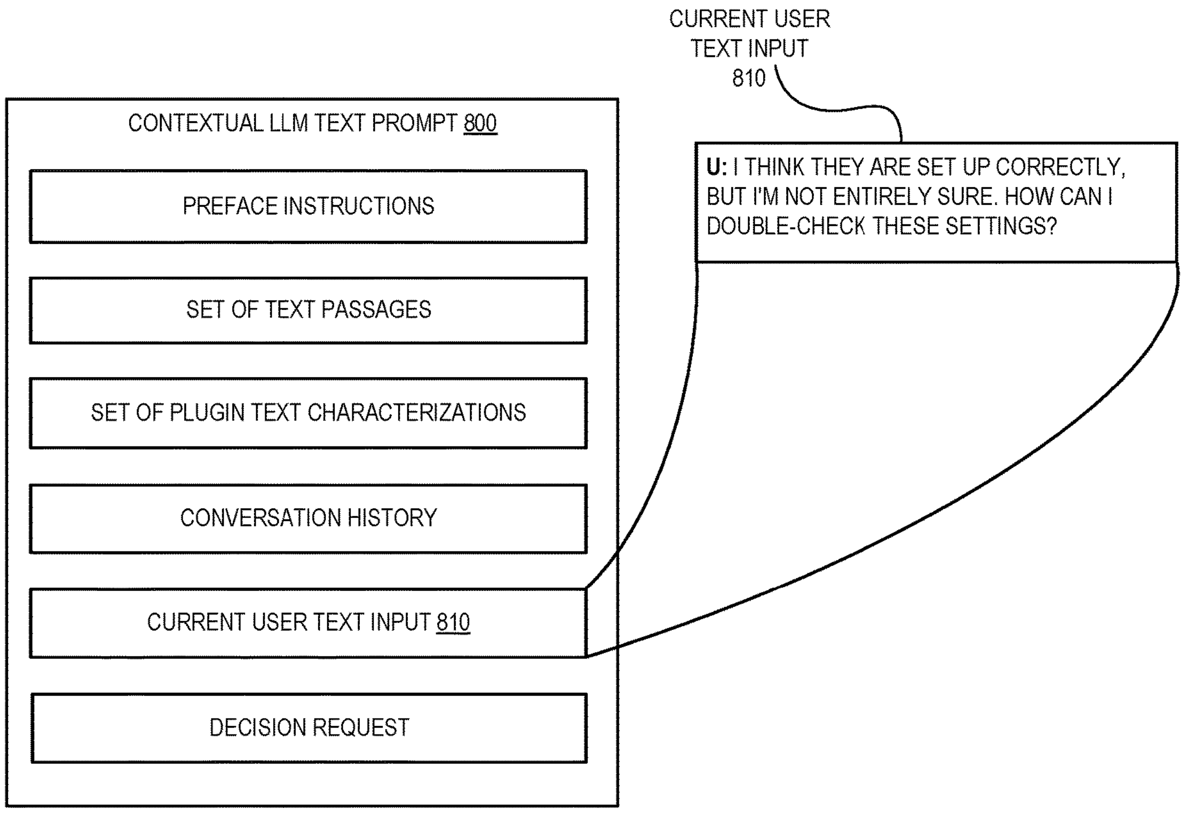
FIG. 8 illustrates an example of the high-level structure of a current user text input of a contextual LLM text prompt for enhanced plugin selection in conversational artificial intelligence systems through contextual large language model prompts.

FIG. 8 illustrates an example of the high-level structure of a current user text input 810 of a contextual LLM text prompt 800 for enhanced plugin selection in conversational artificial intelligence systems through contextual large language model prompts. The inclusion of the current user text input 810 in the contextual LLM text prompt 800 is a critical element that directly informs the LLM's processing and the text completion 130 generation. This component of the contextual LLM text prompt 800 represents the most recent query or command provided by the user, serving as the immediate catalyst for the AI assistant's subsequent actions. Including the current user text input 810 within the contextual LLM text prompt 800 ensures that the LLM's analysis and the resulting text completion 130 are acutely focused on addressing the specific request or concern raised by the user at that point in the user-agent conversation 118.

The current user text input 810 is useful for several reasons. Firstly, it provides the LLM with a text phrasing of the current user input 122, including any specific details, questions, or keywords that the user has included. This precise information allows the LLM to tailor its processing and generate the text completion 130 that is directly relevant to the user's stated needs or interests. By grounding the LLM's analysis in the specific content of the current user text input 810, the system can produce responses that are more accurate, informative, and contextually appropriate.

Moreover, including the current user text input 810 in the contextual LLM text prompt 800 enables the LLM to consider the current user input text input 810 within the broader context of the conversation history, text passages, plugin characterizations, and other elements of the contextual LLM text prompt 800. This holistic approach to processing ensures that the LLM's response not only addresses the immediate query but also aligns with the overall trajectory and context of the user-agent conversation 118. It allows the LLM to apply its deep understanding of language and context to navigate the complexities of the conversation, identifying the most relevant information or actions to take in response to the user's query.

Figure 9:
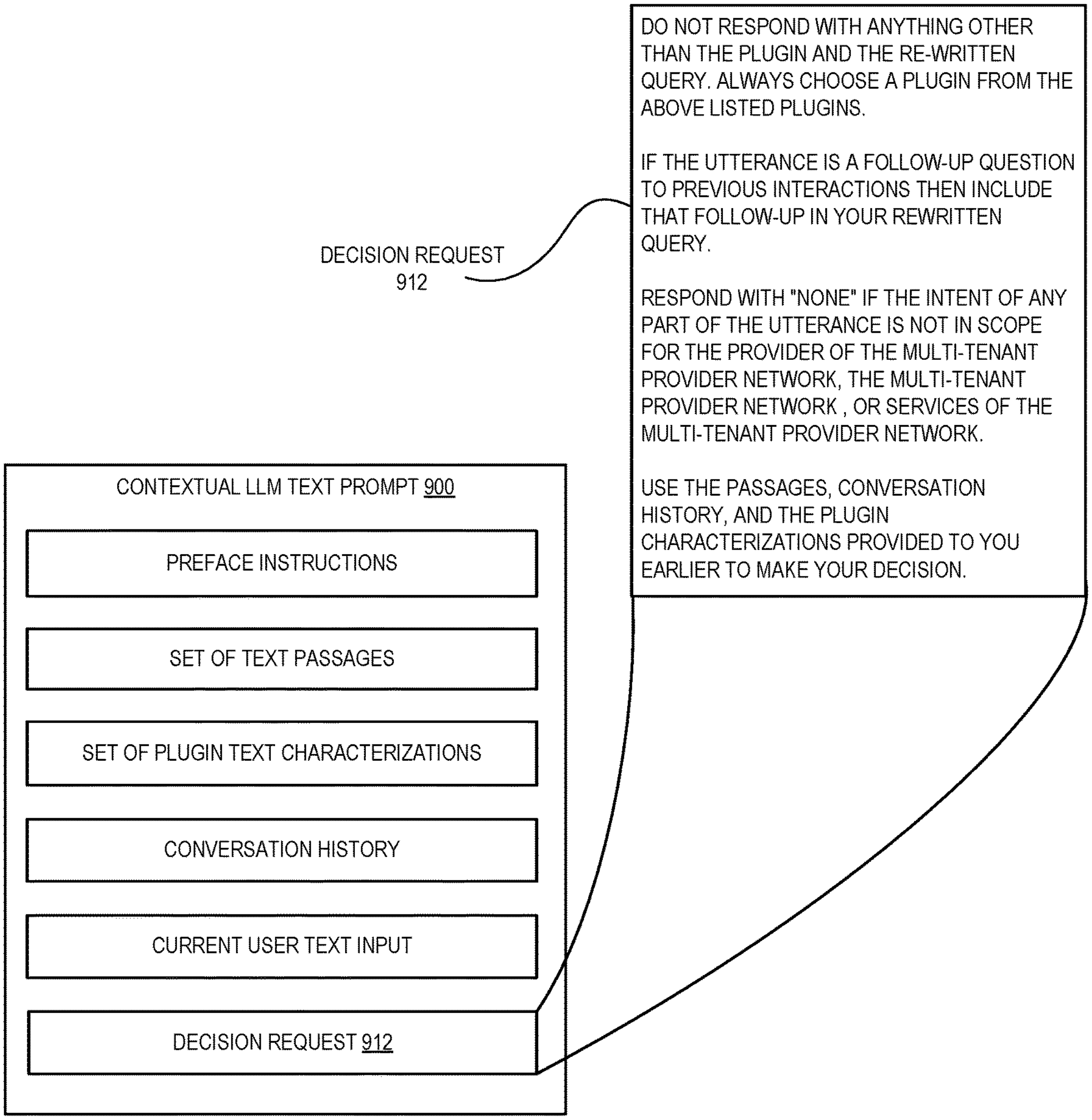
FIG. 9 illustrates an example of the high-level structure of a decision request of a contextual LLM text prompt for enhanced plugin selection in conversational artificial intelligence systems through contextual large language model prompts.

FIG. 9 illustrates an example of the high-level structure of a decision request 912 of a contextual LLM text prompt 900 for enhanced plugin selection in conversational artificial intelligence systems through contextual large language model prompts. The inclusion of a decision request 912 within the contextual LLM text prompt 900 guides the LLM's processing towards a specific outcome that is used to advance the user-agent conversation 118. This decision request 912 is essentially an instruction embedded within the contextual LLM text prompt 900 that directs the LLM to generate the text completion 130 that not only addresses the current user input 122 but also makes a recommendation or determines which candidate generative AI assistant plugin is best suited to handle the current user input 122. By specifying this as part of the contextual LLM text prompt 900, the dialog manager 106 effectively focuses the LLM's vast analytical capabilities on a task that goes beyond mere information retrieval or response generation—it asks the LLM to engage in decision-making based on the analysis of the provided context, including the user's input, the relevant text passages, the characterizations of the plugins, and the conversation history.

The example decision request 912 with the contextual LLM text prompt 900 articulates a set of precise instructions designed to guide the LLM's processing and output generation in a highly focused manner. This decision request 912 serves as a directive for the LLM, ensuring that its response is not only relevant and useful but also adheres to the specific operational parameters of the generative artificial intelligence (AI) assistant service 104 within the multi-tenant provider network environment 100. The instructions contained within the decision request 912 can be broken down into several directives:

Restriction to Plugin and Re-written Query: The LLM is instructed to limit its response to identifying the most appropriate plugin from the list of candidate plugins previously characterized and to provide a re-written version of the user's query that is tailored for that plugin. This ensures that the output is directly actionable, facilitating a streamlined process for forwarding the plugin query to the selected plugin for further processing and response generation.

Inclusion of Follow-up in Re-written Query: If the current user input 122 is a follow-up question, the LLM is directed to incorporate this context into the re-written query. This ensures that the continuity and coherence of the conversation are maintained, allowing the plugin to provide a response that accurately reflects the progression of the user-agent interaction and addresses any ongoing or evolving user needs.

Handling Out-of-Scope Utterances: The LLM is instructed to respond with "NONE" if it determines that any part of the user's input falls outside the scope of services provided by the multi-tenant provider network 102. This directive is useful for managing user expectations and ensuring that the generative AI assistant service 104 focuses its resources on queries it is equipped to handle, while also providing a clear signal for the dialog manager 106 to handle out-of-scope inquiries appropriately.

Utilization of Provided Information: Finally, decision request 912 emphasizes the importance of using the provided text passages, conversation history, and plugin characterizations to inform the decision-making process. This directive ensures that the LLM's analysis and resulting decisions are grounded in relevant and comprehensive information, enhancing the accuracy and relevance of its determinations.

Overall, this decision request 912 encapsulates a structured approach to leveraging the LLM's capabilities for precise, goal-oriented tasks within the AI assistant service framework. By specifying these directives, the dialog manager 106 optimizes the LLM's contribution to the service's operational flow, ensuring that responses are not only informative and relevant but also aligned with the service's objectives and the user's needs.

An example use case could involve a user interacting with the generative AI assistant service 104 to double-check their subnet settings and network access control lists (ACLs) for a virtual machine instance hosted within their VPN in the multi-tenant provider network 102. The user, seeking to ensure that their configuration is correctly set up to maintain security and connectivity, submits a query through the client interface, which could be a dashboard, or a command-line tool provided by the multi-tenant provider network.

Upon receiving this query, the dialog manager 106 captures the user's input via the intermediate network 112 and formulates a text passage search query based on the user's request. This might involve seeking out documentation, best practices, or troubleshooting guides related to subnet settings and ACL configurations for virtual machine instances within a VPN context. Dialog manager 106 retrieves relevant text passages from the text passage retrieval service 108, gathering information that can help in verifying or correcting the user's configurations.

Next, the dialog manager 106 generates a contextual LLM text prompt that includes the retrieved text passages, along with text characterizations of candidate generative AI assistant plugins include one or more plugins that are capable of handling network configurations and security settings, and the current user input. This contextual LLM text prompt is sent to the LLM service 110, which processes the information and generates a text completion indicating the particular plugin best suited for the task-such as a network troubleshooting or configuration verification plugin.

The dialog manager 106 then sends a plugin query to the selected plugin, which specifically deals with network settings and ACLs for virtual machine instances within a VPN. The plugin processes the query and generates a plugin response, which could include a checklist, diagnostic results, or corrective recommendations to ensure the user's settings are correctly configured.

Finally, the dialog manager 106 crafts this plugin response into an agent response, which is then sent back to the user via the intermediate network 112. The user receives a detailed and informative answer, providing them with the assurance that their subnet settings and ACLs are correctly set up or guiding them through any necessary adjustments to secure and optimize their virtual machine instance's connectivity within the VPN hosted on the multi-tenant provider network 102.

This use case exemplifies the disclosed techniques' capability to efficiently address specific technical inquiries, leveraging the collaborative power of AI and specialized plugins to deliver accurate, actionable insights directly relevant to the user's operational context within the multi-tenant provider network 102.

Figure 10:
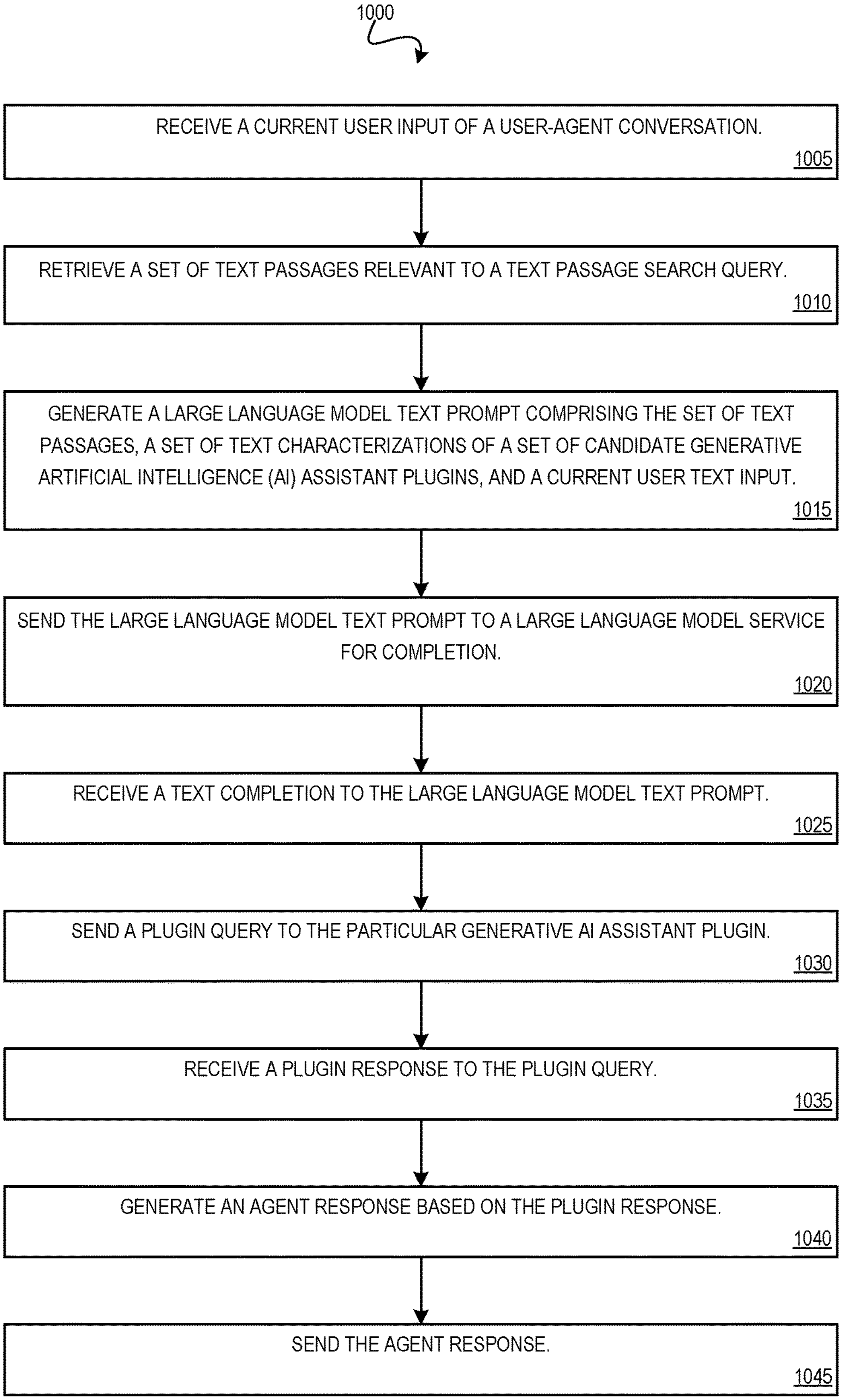
FIG. 10 illustrates a method for enhanced plugin selection in conversational artificial intelligence systems through contextual large language model prompts.

FIG. 10 illustrates a method 1000 for enhanced plugin selection in conversational AI systems through contextual large language model prompts. In an embodiment, the method is performed by dialog manager 106 of the generative AI assistant service 104 in the multi-provider network 102 depicted in FIG. 1. However, in general, the method 1000 can be performed by one or more programmable electronic devices (e.g., programmable electronic device 1500 of FIG. 15).

The method 1000 includes the step of receiving 1005 a current user input of a user-agent conversation involves an interaction between a user and the AI-driven conversational system within a multi-tenant provider network environment. This interaction occurs at the client's end, where the user initiates a conversation or submits a query. The current user input is received by the dialog manager, which is part of the generative artificial intelligence (AI) assistant service provided within the multi-tenant provider network. The dialog manager acts as the central component responsible for processing and managing the conversation flow. It receives the user input via the intermediate network, which serves as the communication channel between the client and the AI assistant service.

Method 1000 includes the step of retrieving 1010 a set of text passages relevant to a text passage search query after the dialog manager has received the current user input. The dialog manager, operating within the multi-tenant provider network environment, is responsible for gathering pertinent information to effectively respond to the user's query or input. To achieve this, it initiates a text passage search query, either directly based on the received user input or by generating a query derived from it. This query is then utilized to search for relevant text passages within the network's repository of information. The dialog manager leverages a text passage retrieval service within the multi-tenant provider network to efficiently locate and retrieve these passages. These passages typically contain valuable information that can aid in formulating an appropriate response to the user's input.

Method 1000 includes the step of generating 1015 a large language model text prompt preparing the AI assistant to effectively respond to the user's input within the multi-tenant provider network environment. This step is facilitated by the dialog manager, which synthesizes various elements to construct a comprehensive prompt for further processing. Firstly, the dialog manager incorporates the set of text passages retrieved earlier, ensuring that the prompt is enriched with relevant information contextualized to the user's query or input. Additionally, it incorporates a set of text characterizations representing different candidate generative artificial intelligence (AI) assistant plugins available within the network environment. These characterizations encompass features, capabilities, or unique attributes of each plugin, enabling the system to select an appropriate plugin for generating a response. Lastly, the current user text input, which may directly stem from the user's initial input or be derived from it, is included to maintain continuity and relevance within the conversation context. By amalgamating these components, the dialog manager constructs a comprehensive prompt tailored to guide the subsequent interactions with the large language model service.

Method 1000 includes the step of sending 1020 the large language model text prompt to a large language model service for completion. Once the dialog manager has synthesized the comprehensive text prompt comprising relevant text passages, characterizations of candidate AI assistant plugins, and the current user's input, it forwards this prompt to a specialized large language model service. This service acts as a powerful system capable of natural language processing and generation, capable of comprehending complex inputs and generating coherent responses. By sending the prompt to the large language model service, the system leverages the immense capabilities of AI models to produce a meaningful completion tailored to the specific context of the user-agent conversation. The large language model analyzes the input prompt holistically, assimilating information from the text passages, understanding the characteristics of available AI assistant plugins, and considering the user's input to craft a response that is coherent, contextually relevant, and aligns with the goals of the conversation.

Method 100 includes the step of receiving 1025 a text completion to the large language model text prompt marks a juncture in the conversational process within the multi-tenant provider network environment. Once the dialog manager has dispatched the comprehensive text prompt to a specialized large language model service for completion, it awaits the generated response. This text completion, crafted by the large language model based on the input prompt provided, encapsulates the synthesized understanding and generation capabilities of advanced AI technologies. Upon receiving the text completion, the dialog manager evaluates and assimilates its content to progress the user-agent conversation effectively. The completion serves as a refined output, incorporating insights derived from the amalgamation of text passages, candidate AI assistant plugin characteristics, and the user's input. It signifies the culmination of the AI-driven processing undertaken to synthesize a coherent and contextually relevant response. The dialog manager analyzes the text completion to ascertain the particular generative AI assistant plugin indicated within it, facilitating subsequent interactions tailored to the capabilities and functionalities of the designated plugin.

Method 100 includes the step of sending 1030 a plugin query to the particular generative AI assistant plugin. After receiving the text completion from the large language model service, the dialog manager identifies the indicated generative AI assistant plugin and proceeds to query it for further assistance or information. This plugin query serves as a request directed towards the designated plugin, seeking specific input or action based on the context established within the ongoing user-agent conversation. The dialog manager formulates the query to extract relevant insights, address user queries, or perform tasks aligned with the capabilities of the chosen plugin. The content and structure of the query are tailored to elicit a response that contributes meaningfully to the ongoing interaction, ensuring coherence and relevance in the subsequent agent response.

Method 100 includes the step of receiving 1035 a plugin response to the plugin query. After sending the plugin query to the designated generative AI assistant plugin, the dialog manager awaits a response tailored to the specific query posed. This plugin response embodies the expertise and capabilities of the selected plugin, providing insights, information, or actions relevant to the user's input and the context of the conversation. Upon receiving the plugin response, the dialog manager evaluates its content and extracts pertinent information to inform the generation of the agent response. The response may include various forms of data, such as text, multimedia content, or structured data, depending on the nature of the query and the capabilities of the plugin. The dialog manager synthesizes the received information, integrating it with other contextual elements such as the user's input, text passages, and candidate plugin characterizations, to craft a coherent and meaningful agent response.

Method 100 includes the step of generating 1040 an agent response based on the plugin response. After receiving the plugin response from the designated generative AI assistant plugin, the dialog manager processes the information provided to formulate an appropriate and coherent agent response. This response is crafted to address the user's query or input effectively and contribute meaningfully to the ongoing user-agent conversation. Depending on the nature of the plugin response, the agent response may include various forms of data, such as text, multimedia content, or structured information, tailored to meet the user's needs and preferences. The dialog manager leverages its understanding of the conversation context and the capabilities of the designated plugin to generate a response that enhances the overall user experience within the multi-tenant provider network environment. Finally, the dialog manager dispatches the agent response to the client via the intermediate network, facilitating seamless communication and interaction between the user and the AI assistant service. In an embodiment, the dialog manager prompts an LLM to craft the agent response based on the plugin response. For example, the dialog manager can generate a LLM prompt that includes the current user text input and the plugin response and ask the LLM to generate a response to the current user text input informed by the plugin response.

Method 100 includes the step of sending 1045 the agent response. After generating the agent response based on the received plugin response, the dialog manager prepares to relay this response back to the client, where the user-agent conversation originated. The agent response, carefully crafted to address the user's input and needs, encapsulates the synthesized understanding and contextual relevance gleaned from the interaction between the AI assistant service and the designated generative AI assistant plugin. This response may include various forms of content, such as text, multimedia, or structured data, tailored to provide the user with accurate and pertinent information or assistance. Once the agent response is ready, the dialog manager utilizes the intermediate network to transmit it back to the client. Leveraging the network infrastructure, the dialog manager ensures seamless and efficient communication between the AI assistant service and the client, facilitating a smooth exchange of information and enabling real-time interaction.

Figure 11:
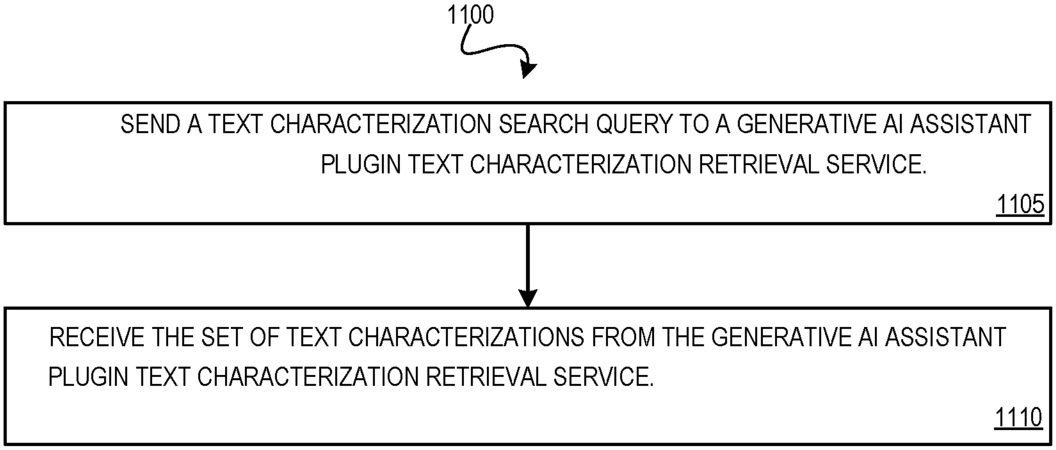
FIG. 11 illustrates a method that refines the method of FIG. 10 by introducing a step to query and retrieve text characterizations of generative artificial intelligence assistant plugins based on the user's input.

FIG. 11 illustrates a method 1100 that refines the method 1000 of FIG. 10 by introducing a step to query and retrieve text characterizations of generative artificial intelligence assistant plugins based on the user's input.

Method 1100 includes the step of sending 1105 a text characterization search query to a generative artificial intelligence (AI) assistant plugin text characterization retrieval service within a multi-tenant provider network. This step involves the dialog manager, which operates within the multi-tenant provider network, actively sending a query specifically designed to retrieve text characterizations. These text characterizations are useful for identifying and understanding the context, features, and potential responses related to the current user input, or input that is generated based on the current user's input. The query itself is crafted based on the content of the user's input, ensuring that the search for text characterizations is directly relevant to the ongoing conversation.

The generative AI assistant plugin text characterization retrieval service then processes this query. Its purpose is to access and return a set of text characterizations that are pertinent to the user's input. These characterizations are critical for the dialog manager to generate a comprehensive language model text prompt, which includes not only the set of text passages retrieved in response to a prior search but also the relevant characterizations of candidate generative AI assistant plugins. This enriched prompt allows for a more informed and contextually appropriate generation of text completions by the large language model service, ultimately leading to a selection of a particular generative AI assistant plugin that is best suited to respond to the user's current input.

Method 1100 includes the step of receiving 1110 the set of text characterizations from the generative artificial intelligence (AI) assistant plugin text characterization retrieval service. This enhances the dialog manager's capability to craft a nuanced and contextually rich response in a user-agent conversation. This process occurs after the dialog manager has sent out a text characterization search query to the retrieval service, which is specifically designed to gather information that aids in understanding the nuances, themes, and relevant aspects of the current user input or its generated counterpart. The retrieval service, a specialized component of the multi-tenant provider network, processes this query and returns a set of text characterizations. These characterizations provide a detailed understanding of the potential content and context of candidate generative AI assistant plugins that could be utilized in responding to the user's query.

The receipt of these text characterizations by the dialog manager enables the dialog manager to have a broader and more informed perspective on how different generative AI assistant plugins might interpret or respond to the user's input, based on their respective characterizations. This knowledge is useful in constructing a large language model text prompt that not only incorporates relevant text passages but also includes these characterizations and the current user text input. By integrating this comprehensive set of data, the dialog manager can facilitate a more targeted and effective interaction with the large language model service, leading to the generation of a text completion that more accurately reflects the user's needs or queries.

Figure 12:
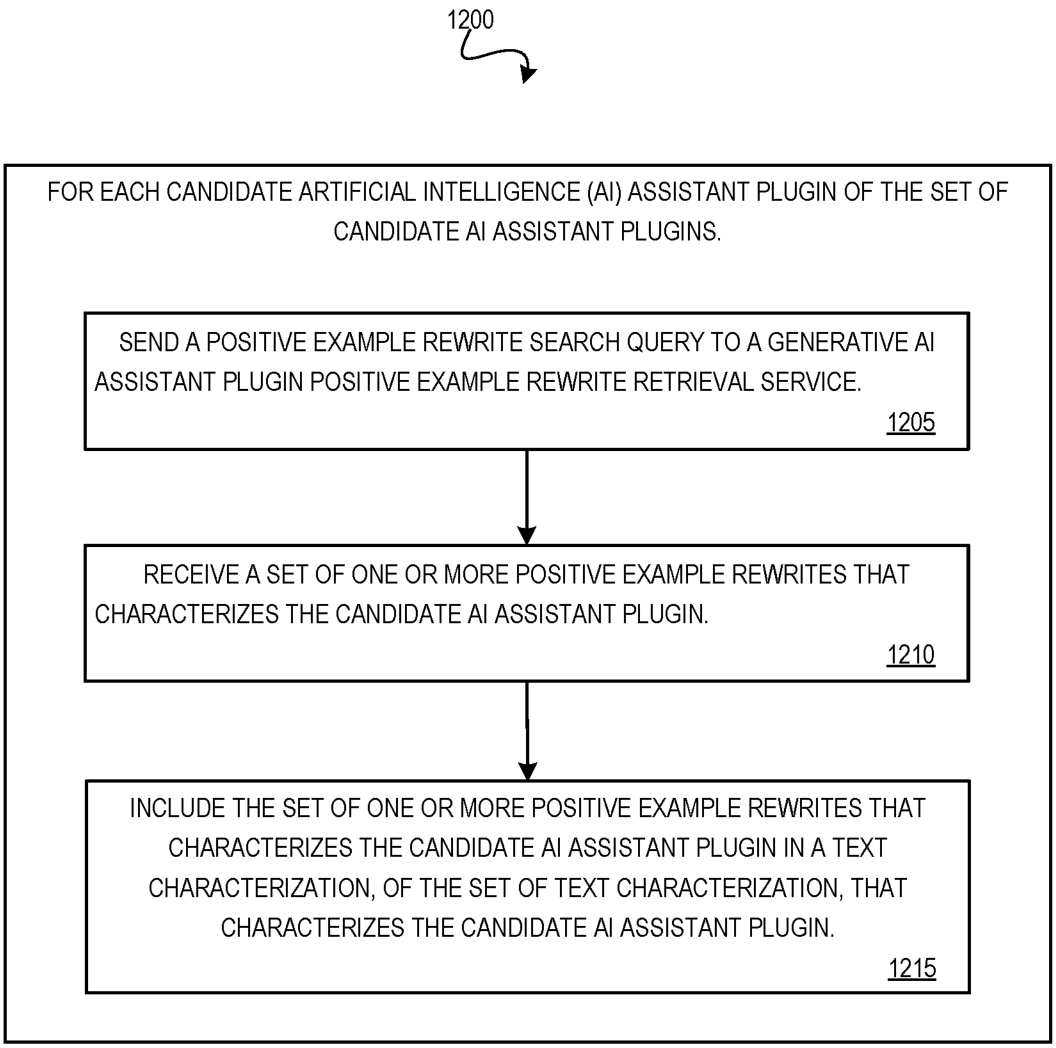
FIG. 12 illustrates a method enhancing the method of FIG. 10 by introducing a process to enrich plugin selection with positive example rewrites for each candidate artificial assistant plugin, informed by the user's input.

FIG. 12 illustrates method 1200 enhancing the method 1000 of FIG. 10 by introducing a process to enrich plugin selection with positive example rewrites for each candidate artificial assistant plugin, informed by the user's input.

Method 1200 includes the steps 1205, 1210, and 1215 performed for each candidate artificial intelligence (AI) assistant plugin within the set of candidate AI assistant plugins. Steps 1205, 1210, and 1215 focus on enhancing the dialog manager's ability to select the most appropriate plugin for generating a response to the user's input. This process begins with the dialog manager sending 1205 a positive example rewrite search query to a generative AI assistant plugin positive example rewrite retrieval service. This query is specifically designed to retrieve examples that showcase the candidate AI assistant plugin's capabilities and nuances in handling various types of user inputs. The search query is constructed based on the current user input or an interpretation of that input, aiming to find positive example rewrites that are directly relevant to the ongoing conversation.

Upon sending this query, the dialog manager then receives 1210 a set of one or more positive example rewrites. These rewrites serve as illustrative examples that characterize the unique capabilities, style, or approach of the candidate AI assistant plugin in processing and responding to user inputs. The inclusion of these positive example rewrites is useful in the LLM prompt, as they provide tangible evidence of how each plugin might handle similar inputs, thereby enabling the LLM to make a more informed selection process.

Finally, the received set of positive example rewrites is incorporated 1215 into the text characterization for the respective candidate AI assistant plugin in the LLM prompt. This text characterization becomes a part of a larger set of characterizations that describe the features, strengths, and suitable contexts for each plugin within the candidate set. By including these positive example rewrites in the plugin's characterization, the dialog manager enriches the information available for generating the large language model text prompt. This comprehensive dataset, which now includes detailed characterizations and examples of plugin performance, allows the large language model to determine which candidate AI assistant plugin more accurately is most likely to generate an appropriate and effective response to the current user input.

Example Multi-Tenant Provider Networks

Figure 13:
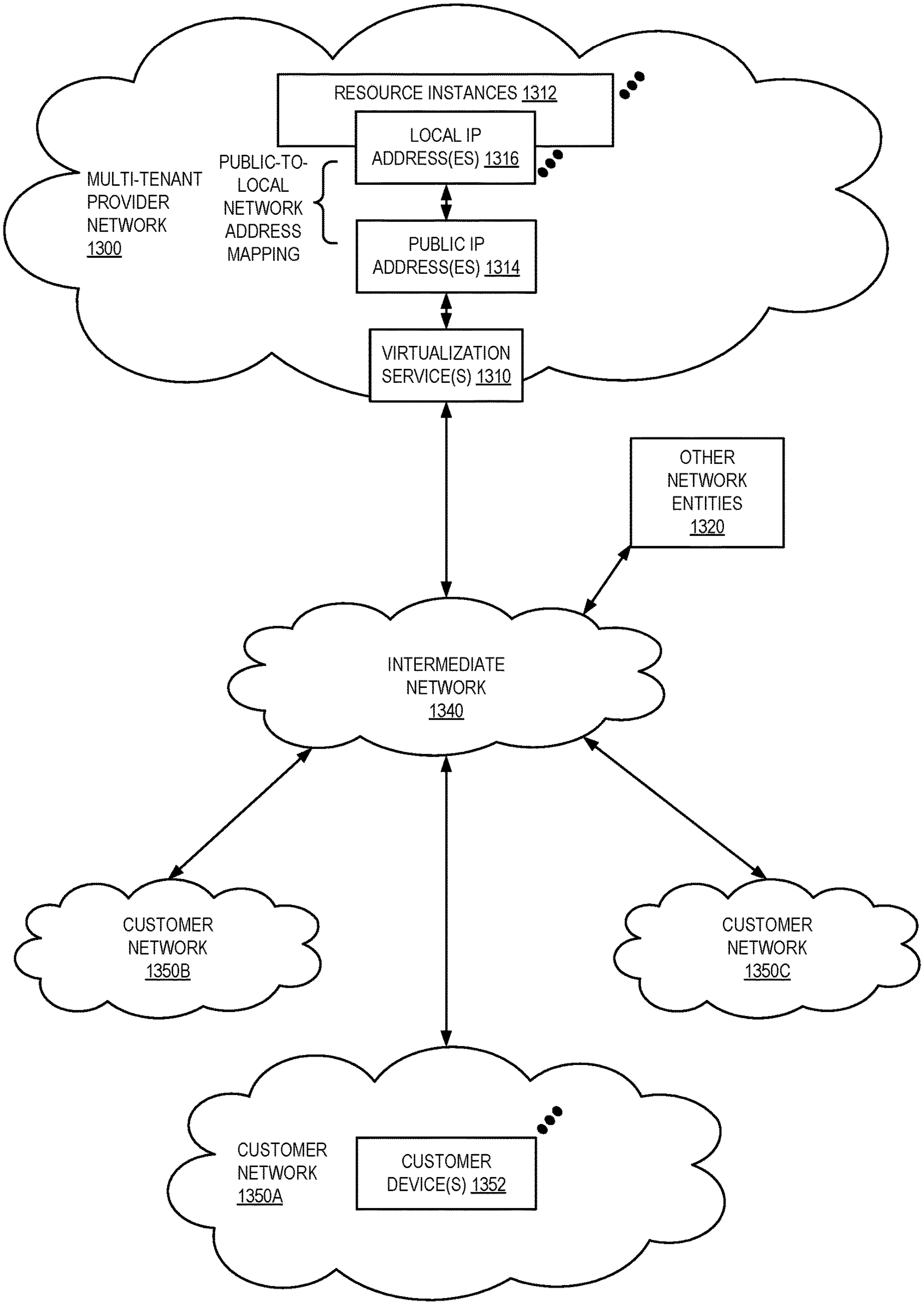
FIG. 13 illustrates an example multi-tenant provider network environment in which the techniques disclosed herein for enhanced plugin selection in conversational artificial intelligence systems through contextual large language model prompts are implemented.

FIG. 13 illustrates an example multi-tenant provider network environment in which the techniques disclosed herein for enhanced plugin selection in conversational artificial intelligence systems through contextual large language model prompts are implemented. A multi-tenant provider network 1300 provides resource virtualization to customers via one or more virtualization services 1310 that allow customers to purchase, rent, or otherwise obtain instances 1312 of virtualized resources, including but not limited to computation and storage resources, implemented on devices within the provider network or networks in one or more data centers. Local Internet Protocol (IP) addresses 1316 are associated with the resource instances 1312; the local IP addresses are the internal network addresses of the resource instances 1312 on the provider network 1300. The provider network 1300 provides public IP addresses 1314 or public IP address ranges (e.g., Internet Protocol version 4 (IPv4) or Internet Protocol version 6 (IPv6) addresses) that customers obtain from the provider network 1300.

The provider network 1300, via the virtualization services 1310, allows a customer of the service provider (e.g., a customer that operates one or more customer networks 1350A-1350C (or "client networks") including one or more customer device(s) 1352) to dynamically associate at least some public IP addresses 1314 assigned or allocated to the customer with resource instances 1312 assigned to the customer. The provider network 1300 also allows the customer to remap a public IP address 1314, previously mapped to one virtualized computing resource instance 1312 allocated to the customer, to another virtualized computing resource instance 1312 that is also allocated to the customer. Using the virtualized computing resource instances 1312 and public IP addresses 1314 provided by the service provider, a customer of the service provider such as the operator of the customer network(s) 1350A-1350C implement customer-specific applications and present the customer's applications on an intermediate network 1340, such as the Internet. Other network entities 1320 on the intermediate network 1340 then generate traffic to a destination public IP address 1314 published by the customer network(s) 1350A-1350C; the traffic is routed to the service provider data center, and at the data center is routed, via a network substrate, to the local IP address 1316 of the virtualized computing resource instance 1312 currently mapped to the destination public IP address 1314. Similarly, response traffic from the virtualized computing resource instance 1312 is routed via the network substrate back onto the intermediate network 1340 to the source entity 1320.

Local IP addresses, as used herein, refer to the internal or "private" network addresses, for example, of resource instances in a provider network. Local IP addresses are within address blocks reserved by Internet Engineering Task Force (IETF) Request for Comments (RFC) 1918 or of an address format specified by IETF RFC 4193 and is mutable within the provider network. Network traffic originating outside the provider network is not directly routed to local IP addresses; instead, the traffic uses public IP addresses that are mapped to the local IP addresses of the resource instances. The provider network 1300 includes networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance. Some public IP addresses are assigned by the provider network infrastructure to particular resource instances; these public IP addresses are referred to as standard public IP addresses, or simply standard IP addresses. The mapping of a standard IP address to a local IP address of a resource instance is the default launch configuration for all resource instance types.

At least some public IP addresses are allocated to or obtained by customers of the provider network 1300; a customer then assigns their allocated public IP addresses to particular resource instances allocated to the customer. These public IP addresses are referred to as customer public IP addresses, or simply customer IP addresses. Instead of being assigned by the provider network 1300 to resource instances as in the case of standard IP addresses, customer IP addresses are assigned to resource instances by the customers, for example via an API provided by the service provider.

Unlike standard IP addresses, customer IP addresses are allocated to customer accounts and are remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses enable a customer to engineer around problems with the customer's resource instances or software by remapping customer IP addresses to replacement resource instances.

Figure 14:
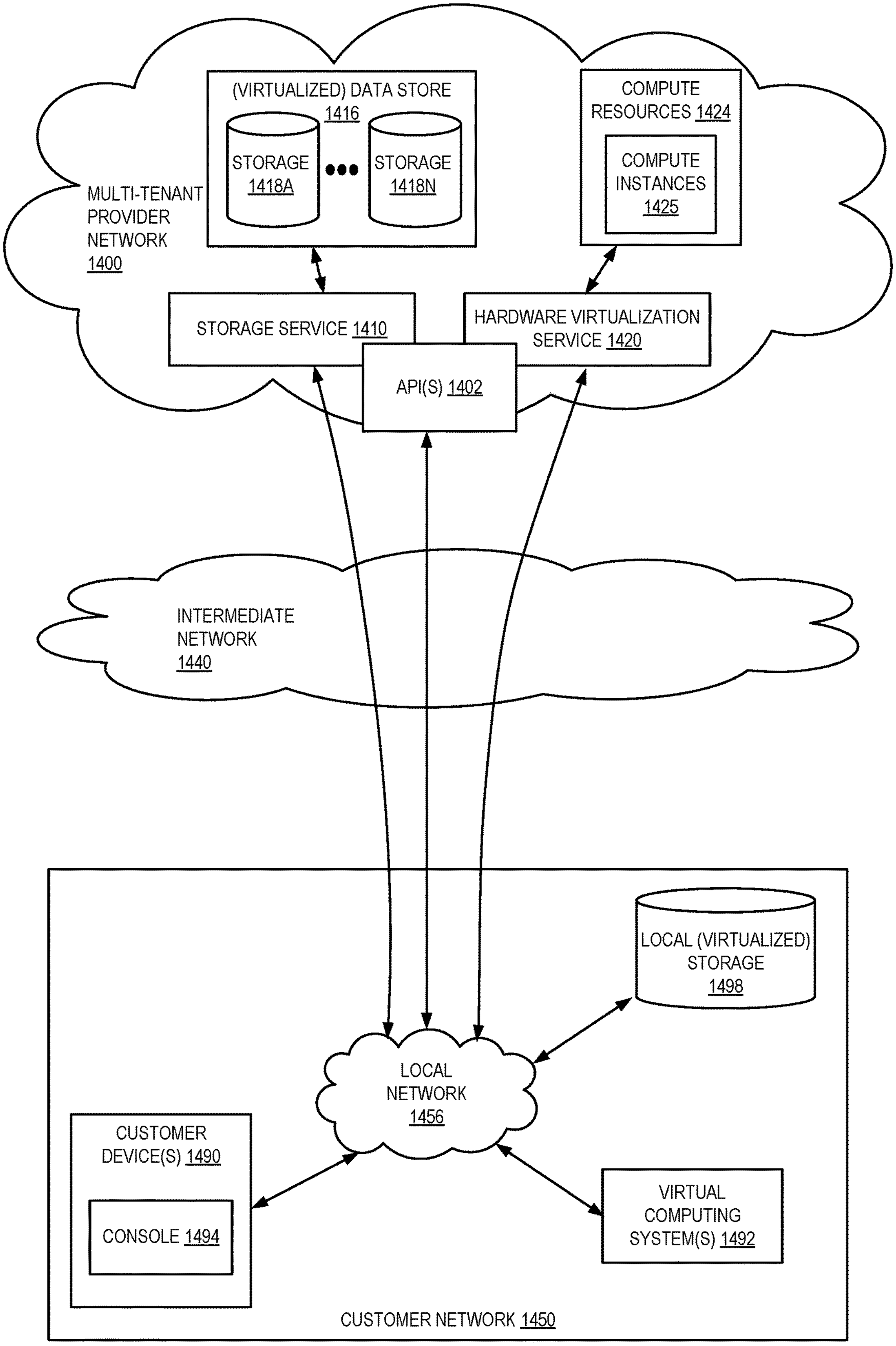
FIG. 14 illustrates an example multi-tenant provider network that provides a storage service and a hardware virtualization service to customers and in which the techniques disclosed herein for enhanced plugin selection in conversational artificial intelligence systems through contextual large language model prompts are implemented.

FIG. 14 illustrates an example multi-tenant provider network that provides a storage service and a hardware virtualization service to customers and in which the techniques disclosed herein for enhanced plugin selection in conversational artificial intelligence systems through contextual large language model prompts are implemented. A hardware virtualization service 1420 provides multiple compute resources 1424 (e.g., compute instances 1425, such as VMs) to customers. The compute resources 1424 are provided as a service to customers of a provider network 1400 (e.g., to a customer that implements a customer network 1450). Each computation resource 1424 is provided with one or more local IP addresses. The provider network 1400 is configured to route packets from the local IP addresses of the compute resources 1424 to public Internet destinations, and from public Internet sources to the local IP addresses of the compute resources 1424.

The provider network 1400 provides the customer network 1450, for example coupled to an intermediate network 1440 via a local network 1456, the ability to implement virtual computing systems 1492 via the hardware virtualization service 1420 coupled to the intermediate network 1440 and to the provider network 1400. The hardware virtualization service 1420 provides one or more APIs 1402, for example a web services interface, via which the customer network 1450 accesses functionality provided by the hardware virtualization service 1420, for example via a console 1494 (e.g., a web-based application, standalone application, mobile application, etc.) of a customer device 1490. At the provider network 1400, each virtual computing system 1492 at the customer network 1450 corresponds to a computation resource 1424 that is leased, rented, or otherwise provided to the customer network 1450.

From an instance of the virtual computing system(s) 1492 or another customer device 1490 (e.g., via console 1494), the customer accesses the functionality of a storage service 1410, for example via the one or more APIs 1402, to access data from and store data to storage resources 1418A-1418N of a virtual data store 1416 (e.g., a folder or "bucket," a virtualized volume, a database, etc.) provided by the provider network 1400. A virtualized data store gateway (not shown) is provided at the customer network 1450 that locally caches at least some data, for example frequently accessed or critical data, and that communicates with the storage service 1410 via one or more communications channels to upload new or modified data from a local cache so that the primary store of data (the virtualized data store 1416) is maintained. In an embodiment, a user, via the virtual computing system 1492 or another customer device 1490, mounts and accesses virtual data store 1416 volumes via the storage service 1410 acting as a storage virtualization service, and these volumes appear to the user as local (virtualized) storage 1498.

While not shown in FIG. 14, the virtualization service(s) are accessed from resource instances within the provider network 1400 via the API(s) 1402. For example, a customer, appliance service provider, or other entity accesses a virtualization service from within a respective virtual network on the provider network 1400 via the API(s) 1402 to request allocation of one or more resource instances within the virtual network or within another virtual network.

Example Programmable Electronic Device

FIG. 15 illustrates an example of a programmable electronic device that processes and manipulates data to perform techniques disclosed herein for enhanced plugin selection in conversational artificial intelligence systems through contextual large language model prompts. Example programmable electronic device 1500 includes electronic components encompassing hardware or hardware and software including processor 1502, memory 1504, auxiliary memory 1506, input device 1508, output device 1510, mass data storage 1512, network interface 1514, and offload card 1524, all connected to bus 1516. Network 1522 is connected to, but not part of, programmable electronic device 1500.

While only one of each type of component is depicted in FIG. 15 for the purpose of providing a clear example, multiple instances of any or all these electronic components are present in device 1500 in other instances. For example, in an embodiment, multiple processors are connected to bus 1516. Accordingly, unless the context clearly indicates otherwise, reference with respect to FIG. 15 to a component of device 1500 in the singular such as, for example, processor 1502, is not intended to exclude the plural where, in a particular instance of device 1500, multiple instances of the electronic component are present. Further, some electronic components might not be present in a particular instance of device 1500. For example, device 1500 in a headless configuration such as, for example, when operating as a server racked in a data center, might not include, or be connected to, input device 1508 or output device 1510. As another example, offload card 1524 might be absent from device 1500 when not operating as a server racked in a data center as part of a cloud-based hosted compute service.

Processor 1502 is an electronic component that processes (e.g., executes, interprets, or otherwise processes) instructions 1518 including instructions 1520 for enhanced plugin selection in conversational artificial intelligence systems through contextual large language model prompts. In an embodiment, processor 1502 fetches, decodes, and executes instructions 1518 from memory 1504 and performs arithmetic and logic operations dictated by instructions 1518 and coordinates the activities of other electronic components of device 1500 in accordance with instructions 1518. In an embodiment, processor 1502 is made using silicon wafers according to a manufacturing process (e.g., 7 nm, 5 nm, or 3 nm). In an embodiment, processor 1502 is configured to understand and execute a set of commands referred to as an instruction set architecture (ISA) (e.g., x86, x86_64, or ARM).

In an embodiment, processor 1502 includes a cache used to store frequently accessed instructions 1518 to speed up processing. In an embodiment, processor 1502 has multiple layers of cache (L1, L2, L3) with varying speeds and sizes.

In an embodiment, processor 1502 is composed of multiple cores where each such core is a processor within processor 1502. The cores allow processor 1502 to process multiple instructions 1518 at once in a parallel processing manner.

In an embodiment, processor 1502 supports multi-threading where each core of processor 1502 handles multiple threads (multiple sequences of instructions) at once to further enhance parallel processing capabilities.

In an embodiment, processor 1502 is any of the following types of central processing units (CPUs): a desktop processor for general computing, gaming, content creation, etc.; a server processor for data centers, enterprise-level applications, cloud services, etc.; a mobile processor for portable computing devices like laptops and tablets for enhanced battery life and thermal management; a workstation processor for intense computational tasks like 3D rendering and simulations; or any other type of CPU suitable for the particular implementation at hand.

While processor 1502 might be a CPU, processor 1502, in an embodiment, is any of the following types of processors: a graphics processing unit (GPU) capable of highly parallel computation allowing for processing of multiple calculations simultaneously and useful for rendering images and videos and for accelerating machine learning computation tasks; a digital signal processor (DSP) designed to process analog signals like audio and video signals into digital form and vice versa, commonly used in audio processing, telecommunications, and digital imaging; specialized hardware for machine learning workloads, especially those involving tensors (multi-dimensional arrays); a field-programmable gate array (FPGA) or other reconfigurable integrated circuit that is customized post-manufacturing for specific applications, such as cryptography, data analytics, and network processing; a neural processing unit (NPU) or other dedicated hardware designed to accelerate neural network and machine learning computations, commonly found in mobile devices and edge computing applications; an image signal processor (ISP) specialized in processing images and videos captured by cameras, adjusting parameters like exposure, white balance, and focus for enhanced image quality; an accelerated processing unit (APU) combing a CPU and a GPU on a single chip to enhance performance and efficiency, especially in consumer electronics like laptops and consoles; a vision processing unit (VPU) dedicated to accelerating machine vision tasks such as image recognition and video processing, typically used in drones, cameras, and autonomous vehicles; a microcontroller unit (MCU) or other integrated processor designed to control electronic devices, containing CPU, memory, and input/output peripherals; an embedded processor for integration into other electronic devices such as washing machines, cars, industrial machines, etc.; a system on a chip (SoC) such as those commonly used in smartphones encompassing a CPU integrated with other components like a graphics processing unit (GPU) and memory on a single chip; or any other type of processor suitable for the particular implementation at hand.

Memory 1504 is an electronic component that stores data and instructions 1518 that processor 1502 processes. In an embodiment, memory 1504 provides the space for the operating system, applications, and data in current use to be quickly reached by processor 1502. In an embodiment, memory 1504 is a random-access memory (RAM) that allows data items to be read or written in substantially the same amount of time irrespective of the physical location of the data items inside memory 1504.

In an embodiment, memory 1504 is a volatile or non-volatile memory. Data stored in a volatile memory is lost when the power is turned off. Data in non-volatile memory remains intact even when the system is turned off. In an embodiment, memory 1504 is Dynamic RAM (DRAM). DRAM such as Single Data Rate RAM (SDRAM) or Double Data Rate RAM (DDRAM) is volatile memory that stores each bit of data in a separate capacitor within an integrated circuit. The capacitors of DRAM leak charge and need to be periodically refreshed to avoid information loss. In an embodiment, memory 1504 is Static RAM (SRAM). SRAM is volatile memory that is typically faster but more expensive than DRAM. SRAM uses multiple transistors for each memory cell but does not need to be periodically refreshed. Additionally, or alternatively, SRAM is used for cache memory in processor 1502 in an embodiment. In an embodiment, memory 1504 encompasses both DRAM and SRAM.

Device 1500 has auxiliary memory 1506 other than memory 1504. Examples of auxiliary memory 1506 include cache memory, register memory, read-only memory (ROM), secondary storage, virtual memory, memory controller, and graphics memory. In an embodiment, device 1500 has multiple auxiliary memories including different types of auxiliary memories.

Cache memory is found inside or very close to processor 1502 and is typically faster but smaller than memory 1504. Cache memory is used to hold frequently accessed instructions 1518 (encompassing any associated data) to speed up processing. In an embodiment, cache memory is hierarchical ranging from Level 1 cache memory which is the smallest but fastest cache memory and is typically inside processor 1502 to Level 2 and Level 3 cache memory which are progressively larger and slower cache memories that are inside or outside processor 1502.

Register memory is a small but very fast storage location within processor 1502 designed to hold data temporarily for ongoing operations.

ROM is a non-volatile memory device that is only read, not written to. In an embodiment, ROM is a Programmable ROM (PROM), Erasable PROM (EPROM), or electrically erasable PROM (EEPROM). In an embodiment, ROM stores basic input/output system (BIOS) instructions which help device 1500 boot up.

Secondary storage is a non-volatile memory. In an embodiment, secondary storage encompasses any or all of: a hard disk drive (HDD) or other magnetic disk drive device; a solid-state drive (SSD) or other NAND-based flash memory device; an optical drive like a CD-ROM drive, a DVD drive, or a Blu-ray drive; or flash memory device such as a USB drive, an SD card, or other flash storage device.

Virtual memory is a portion of a hard drive or an SSD that the operating system uses as if it were memory 1504. When memory 1504 gets filled, less frequently accessed data and instructions 1518 is "swapped" out to the virtual memory. The virtual memory is slower than memory 1504, but it provides the illusion of having a larger memory 1504.

A memory controller manages the flow of data and instructions 1518 to and from memory 1504. The memory controller is located either on the motherboard of device 1500 or within processor 1502.

Graphics memory is used by a graphics processing unit (GPU) and is specially designed to handle the rendering of images, videos, graphics, or performing machine learning calculations. Examples of graphics memory include graphics double data rate (GDDR) such as GDDR5 and GDDR6.

Input device 1508 is an electronic component that allows users to feed data and control signals into device 1500. Input device 1508 translates a user's action or the data from the external world into a form that device 1500 processes.

Examples of input device 1508 include a keyboard, a pointing device (e.g., a mouse), a touchpad, a touchscreen, a microphone, a scanner, a webcam, a joystick/game controller, a graphics tablet, a digital camera, a barcode reader, a biometric device, a sensor, and a MIDI instrument.

Output device 1510 is an electronic component that conveys information from device 1500 to the user or to another device. The information is in the form of text, graphics, audio, video, or other media representation. Examples of output device 1510 include a monitor or display device, a printer device, a speaker device, a headphone device, a projector device, a plotter device, a braille display device, a haptic device, a LED or LCD panel device, a sound card, and a graphics or video card.

Mass data storage 1512 is an electronic component used to store data and instructions 1518. In an embodiment, mass data storage 1512 is non-volatile memory. Examples of mass data storage 1512 include a hard disk drive (HDD), a solid-state drive (SDD), an optical drive, a flash memory device, a magnetic tape drive, a floppy disk, an external drive, or a RAID array device.

In an embodiment, mass data storage 1512 is additionally or alternatively connected to device 1500 via network 1522. In an embodiment, mass data storage 1512 encompasses a network attached storage (NAS) device, a storage area network (SAN) device, a cloud storage device, or a centralized network filesystem device.

Network interface 1514 (sometimes referred to as a network interface card, NIC, network adapter, or network interface controller) is an electronic component that connects device 1500 to network 1522. Network interface 1514 functions to facilitate communication between device 1500 and network 1522. Examples of a network interface 1514 include an ethernet adaptor, a wireless network adaptor, a fiber optic adapter, a token ring adaptor, a USB network adaptor, a Bluetooth adaptor, a modem, a cellular modem or adapter, a powerline adaptor, a coaxial network adaptor, an infrared (IR) adapter, an ISDN adaptor, a VPN adaptor, and a TAP/TUN adaptor.

Bus 1516 is an electronic component that transfers data between other electronic components of or connected to device 1500. Bus 1516 serves as a shared highway of communication for data and instructions (e.g., instructions 1518), providing a pathway for the exchange of information between components within device 1500 or between device 1500 and another device. Bus 1516 connects the different parts of device 1500 to each other. In an embodiment, bus 1516 encompasses one or more of: a system bus, a front-side bus, a data bus, an address bus, a control bus, an expansion bus, a universal serial bus (USB), a I/O bus, a memory bus, an internal bus, an external bus, and a network bus.

Instructions 1518 are computer-processable instructions that take different forms. In an embodiment, instructions 1518 are in a low-level form such as binary instructions, assembly language, or machine code according to an instruction set (e.g., x86, ARM, MIPS) that processor 1502 is designed to process. In an embodiment, instructions 1518 include individual operations that processor 1502 is designed to perform such as arithmetic operations (e.g., add, subtract, multiply, divide, etc.); logical operations (e.g., AND, OR, NOT, XOR, etc.); data transfer operations including moving data from one location to another such as from memory 1504 into a register of processor 1502 or from a register to memory 1504; control instructions such as jumps, branches, calls, and returns; comparison operations; and specialization operations such as handling interrupts, floating-point arithmetic, and vector and matrix operations. In an embodiment, instructions 1518 are in a higher-level form such as programming language instructions in a high-level programming language such as Python, Java, C++, etc. In an embodiment, instructions 1518 are in an intermediate level form in between a higher-level form and a low-level form such as bytecode or an abstract syntax tree (AST).

Instructions 1518 for processing by processor 1502 are in different forms at the same or different times. In an embodiment, when stored in mass data storage 1512 or memory 1504, instructions 1518 are stored in a higher-level form such as Python, Java, or other high-level programing language instructions, in an intermediate-level form such as Python or Java bytecode that is compiled from the programming language instructions, or in a low-level form such as binary code or machine code. In an embodiment, when stored in processor 1502, instructions 1518 are stored in a low-level form such as binary instructions, assembly language, or machine code according to an instruction set architecture (ISA). In an embodiment, instructions 1518 are stored in processor 1502 in an intermediate level form or even a high-level form where CPU 1502 processes instructions in such form.

Instructions 1518 are processed by one or more processors of device 1500 using a processing model such as any or all of the following processing models: sequential execution where instructions are processed one after another in a sequential manner; pipelining where pipelines are used to process multiple instruction phases concurrently; multiprocessing where different processors different instructions concurrently, sharing the workload; thread-level parallelism where multiple threads run in parallel across different processors; simultaneous multithreading or hyperthreading where a single processor processes multiple threads simultaneously, making it appear as multiple logical processors; multiple instruction issue where multiple instruction pipelines allow for the processing of several instructions during a single clock cycle; parallel data operations where a single instruction is used to perform operations on multiple data elements concurrently; clustered or distributed computing where multiple processors in a network (e.g., in the cloud) collaboratively process the instructions, distributing the workload across the network; graphics processing unit (GPU) acceleration where GPUs with their many processors allow the processing of numerous threads in parallel, suitable for tasks like graphics rendering and machine learning; asynchronous execution where processing of instructions is driven by events or interrupts, allowing the one or more processors to handle tasks asynchronously; concurrent instruction phases where multiple instruction phases (e.g., fetch, decode, execute) of different instructions are handled concurrently; parallel task processing where different processors handle different tasks or different parts of data, allowing for concurrent processing and execution; or any other processing model suitable to meet the requirements of the particular implementation at hand.

Network 1522 is a collection of interconnected computers, servers, and other programmable electronic devices that allow for the sharing of resources and information. Network 1522 ranges in size from just two connected devices to a global network (e.g., the internet) with many interconnected devices. In an embodiment, network 1522 encompasses network devices such as routers, switches, hubs, modems, and access points.

Individual devices on network 1522 are sometimes referred to as "network nodes." Network nodes communicate with each other through mediums or channels sometimes referred to as "network communication links." The network communication links are wired (e.g., twisted-pair cables, coaxial cables, or fiber-optic cables) or wireless (e.g., Wi-Fi, radio waves, or satellite links). Network nodes follow a set of rules sometimes referred to "network protocols" that define how the network nodes communicate with each other. Example network protocols include data link layer protocols such as Ethernet and Wi-Fi, network layer protocols such as IP (Internet Protocol), transport layer protocols such as TCP (Transmission Control Protocol), application layer protocols such as HTTP (Hypertext transfer Protocol) and HTTPS (HTTP Secure), and routing protocols such as OSPF (Open Shortest Path First) and BGP (Border Gateway Protocol).

Network 1522 has a particular physical or logical layout or arrangement sometimes referred to as a "network topology." Example network topologies include bus, star, ring, and mesh. In an embodiment, network 1522 encompasses any or all of the following categories of networks: a personal area network (PAN) that covers a small area (a few meters), like a connection between a computer and a peripheral device via Bluetooth; a local area network (LAN) that covers a limited area, such as a home, office, or campus; a metropolitan area network (MAN) that covers a larger geographical area, like a city or a large campus; a wide area network (WAN) that spans large distances, often covering regions, countries, or even globally (e.g., the internet); a virtual private network (VPN) that provides a secure, encrypted network that allows remote devices to connect to a LAN over a WAN; an enterprise private network (EPN) build for an enterprise, connecting multiple branches or locations of a company; or a storage area network (SAN) that provides specialized, high-speed block-level network access to storage using high-speed network links like Fibre Channel.

Device 1500 includes offload card 1524. Offload card 1524 includes its own processor 1526. Although not depicted in FIG. 1, offload card 1524 In an embodiment also includes network interface 1514. Offload card 1524 is connected to bus 1516 via a Peripheral Component Interconnect-Express (PCI-E) standard or another suitable interconnect standard such as, for example, a QuickPath interconnect (QPI) standard or an UltraPath interconnect (UPI) standard.

In an embodiment, device 1500 includes offload card 1524 when device 1500 acts as a host electronic device such as, for example, when operating as part of a hosted compute service. In this case, device 1500 hosts compute instances such as, for example, virtual machine instances or application container instances and offload card 1524 and processor 1526 run a hosted compute manager application that manages the hosted compute instances that run on device 1500 and processor 1502. In an embodiment, the hosted compute manager application performs hosted compute instance management operations, such as pausing or un-pausing hosted compute instances, launching or terminating hosted compute instances, performing memory transfer/copying operations, or other suitable hosted compute instance management operations. These management operations, in an embodiment, are performed by the hosted compute manager application in coordination with a hypervisor (e.g., upon a request from the hypervisor) that runs on device 1500 and processor 1502. However, in an embodiment, the hosted compute manager application is configured to process requests from other entities (e.g., from the hosted compute instances themselves), and does not coordinate with a hypervisor on device 1500.

TERMINOLOGY

As used herein and in the appended claims, the term "computer-readable media" refers to one or more mediums or devices that store or transmit information in a format that a computer system accesses. Computer-readable media encompasses both storage media and transmission media. Storage media includes volatile and non-volatile memory devices such as RAM devices, ROM devices, secondary storage devices, register memory devices, memory controller devices, graphics memory devices, and the like. Transmission media includes wired and wireless physical pathways that carry communication signals such as twisted pair cable, coaxial cable, fiber optic cable, radio waves, microwaves, infrared, visible light communication, and the like.

As used herein and in the appended claims, the term "non-transitory computer-readable media" encompasses computer-readable media as just defined but excludes transitory, propagating signals. Data stored on non-transitory computer-readable media isn't just momentarily present and fleeting but has some degree of persistence. For example, instructions stored in a hard drive, a SSD, an optical disk, a flash drive, or other storage media are stored on non-transitory computer-readable media. Conversely, data carried by a transient electrical or electromagnetic signal or wave is not stored in non-transitory computer-readable media when so carried.

As used herein and in the appended claims, unless otherwise clear in context, the terms "comprising," "having," "containing," "including," "encompassing," "in response to," "based on," and the like are intended to be open-ended in that an element or elements following such a term is not meant to be an exhaustive listing of elements or meant to be limited to only the listed element or elements.

Unless otherwise clear in context, relational terms such as "first" and "second" are used herein and in the appended claims to differentiate one thing from another without limiting those things to a particular order or relationship. For example, unless otherwise clear in context, a "first device" could be termed a "second device." The first and second devices are both devices, but not the same device.

Unless otherwise clear in context, the indefinite articles "a" and "an" are used herein and in the appended claims to mean "one or more" or "at least one." For example, unless otherwise clear in context, "in an embodiment" means in at least one embodiment, but not necessarily more than one embodiment. Accordingly, unless otherwise clear in context, phrases such as "a device configured to" are intended to include one or more recited devices. Such one or more recited devices, unless otherwise clear in context, are collectively configured to carry out the stated recitations. For example, "a processor configured to carry out recitations A, B and C" encompasses both (a) a single processor configured to carry out recitations A, B, and C and (b) a first processor configured to carry out recitation A working in conjunction with a second processor configured to carry out recitations B and C.

Unless otherwise clear in context, the terms "set," and "collection" should generally be interpreted to include one or more described items throughout this application. Accordingly, unless otherwise clear in context, phrases such as "a set of devices configured to" or "a collection of devices configured to" are intended to include one or more recited devices. Such one or more recited devices, unless otherwise clear in context, are collectively configured to carry out the stated recitations. For example, "a set of servers configured to carry out recitations A, B and C" encompasses both (a) a single server configured to carry out recitations A, B, and C and (b) a first server configured to carry out recitations A and B working in conjunction with a second server configured to carry out recitation C.

As used herein, unless otherwise clear in context, the term "or" is open-ended and encompasses all possible combinations, except where infeasible. For example, if it is stated that a component includes A or B, then, unless infeasible or otherwise clear in context, the component includes at least A, or at least B, or at least A and B. As a second example, if it is stated that a component includes A, B, or C then, unless infeasible or otherwise clear in context, the component includes at least A, or at least B, or at least C, or at least A and B, or at least A and C, or at least B and C, or at least A and B and C.

Unless the context clearly indicates otherwise, conjunctive language in this description and in the appended claims such as the phrase "at least one of X, Y, and Z," is to be understood to convey that an item, term, etc. is either X, Y, or Z, or a combination thereof. Thus, such conjunctive language does not require that at least one of X, at least one of Y, and at least one of Z to each be present.

Unless the context clearly indicates otherwise, the relational term "based on" is used in this description and in the appended claims in an open-ended fashion to describe a logical (e.g., a condition precedent) or causal connection or association between two stated things where one of the things is the basis for or informs the other without requiring or foreclosing additional unstated things that affect the logical or casual connection or association between the two stated things.

Unless the context clearly indicates otherwise, the relational term "in response to" or "responsive to" is used in this description and in the appended claims in an open-ended fashion to describe a stated action or behavior that is done as a reaction or reply to a stated stimulus without requiring or foreclosing additional unstated stimuli that affect the relationship between the stated action or behavior and the stated stimulus.

What is claimed is:

1. A method comprising:

in a multi-tenant provider network environment comprising a multi-tenant provider network, an intermediate network, and a client at which a user-agent conversation is presented:

receiving a current user input of the user-agent conversation from the client; wherein the current user input is received by a dialog manager of a generative artificial intelligence (AI) assistant service of the multi-tenant provider network; wherein the dialog manager receives the current user input via the intermediate network;

retrieving, by the dialog manager, a set of text passages relevant to a text passage search query; wherein the text passage search query comprises the current user input or is generated based on the current user input; wherein the set of text passages are retrieved from a text passage retrieval service of the multi-tenant provider network;

sending a positive example rewrite search query to a generative AI assistant plugin positive example rewrite retrieval service, wherein the positive example rewrite search query comprises the current user input or is generated based on the current user input;

receiving a set of one or more positive example rewrites that characterizes a candidate generative AI assistant plugin of a set of candidate generative AI assistant plugins;

including the set of one or more positive example rewrites that characterizes the candidate generative AI assistant plugin in a text characterization that characterizes the candidate generative AI assistant plugin;

generating, by the dialog manager, a large language model text prompt comprising the set of text passages, a set of text characterizations of the set of candidate generative AI assistant plugins, and a current user text input; wherein the current user text input comprises the current user input or is generated based on the current user input and wherein a text characterization of the set of text characterizations includes the text characterization that characterizes the candidate generative AI assistant plugin;

sending, by the dialog manager, the large language model text prompt to a large language model service for completion;

receiving, by the dialog manager, a text completion to the large language model text prompt; wherein the text completion is generated by a large language model of the large language model service; wherein the text completion indicates a particular generative AI assistant plugin of the set of candidate generative AI assistant plugins;

sending, by the dialog manager, a plugin query to the particular generative AI assistant plugin;

receiving, by the dialog manager, a plugin response to the plugin query;

generating, by the dialog manager, an agent response based on the plugin response; and sending, by the dialog manager, the agent response to the client; wherein the client receives the agent response via the intermediate network.

2. The method of claim 1, further comprising:

sending, by the dialog manager, a text characterization search query to a generative artificial intelligence (AI) assistant plugin text characterization retrieval service of the multi-tenant provider network; wherein the text characterization search query comprises the current user input or is generated based on the current user input; and receiving, by the dialog manager, the set of text characterizations from the generative AI assistant plugin text characterization retrieval service.

3. The method of claim 1, further comprising:

for each respective candidate generative artificial intelligence (AI) assistant plugin of the set of candidate generative AI assistant plugins:

sending a positive example rewrite search query for that respective candidate generative AI assistant plugin to the generative AI assistant plugin positive example rewrite retrieval service; wherein the positive example rewrite search query for that respective candidate generative AI assistant plugin comprises the current user input or is generated based on the current user input;

receiving a set of one or more positive example rewrites that characterizes that respective candidate generative AI assistant plugin; and including the set of one or more positive example rewrites that characterizes that respective candidate generative AI assistant plugin in a text characterization, of the set of text characterizations, that characterizes that respective candidate generative AI assistant plugin.

4. A method comprising:

receiving a current user input of a user-agent conversation;

retrieving a set of text passages relevant to a text passage search query; wherein the text passage search query comprises the current user input or is generated based on the current user input;

sending a positive example rewrite search query to a generative AI assistant plugin positive example rewrite retrieval service, wherein the positive example rewrite search query comprises the current user input or is generated based on the current user input;

receiving a set of one or more positive example rewrites that characterizes a candidate generative artificial intelligence (AI) assistant plugin of a set of candidate generative AI assistant plugins;

including the set of one or more positive example rewrites that characterizes the candidate generative AI assistant plugin in a text characterization that characterizes the candidate generative AI assistant plugin;

generating a large language model text prompt comprising the set of text passages, a set of text characterizations of the set of candidate generative AI assistant plugins, and a current user text input; wherein the current user text input comprises the current user input or is generated based on the current user input and wherein the set of text characterizations includes the text characterization that characterizes the candidate generative AI assistant plugin;

sending the large language model text prompt to a large language model service for completion;

receiving a text completion to the large language model text prompt; wherein the text completion is generated by a large language model of the large language model service; wherein the text completion indicates a particular generative AI assistant plugin of the set of candidate generative AI assistant plugins;

sending a plugin query to the particular generative AI assistant plugin;

receiving a plugin response to the plugin query;

generating an agent response based on the plugin response; and sending the agent response.

5. The method of claim 4, further comprising:

sending a text characterization search query to a generative artificial intelligence (AI) assistant plugin text characterization retrieval service; wherein the text characterization search query comprises the current user input or is generated based on the current user input; and receiving the set of text characterizations from the generative AI assistant plugin text characterization retrieval service.

6. The method of claim 4, further comprising:

for each respective candidate generative artificial intelligence (AI) assistant plugin of the set of candidate generative AI assistant plugins:

sending a positive example rewrite search query for that respective candidate generative AI assistant plugin to the generative AI assistant plugin positive example rewrite retrieval service; wherein the positive example rewrite search query for that respective candidate generative AI assistant plugin comprises the current user input or is generated based on the current user input;

receiving a set of one or more positive example rewrites that characterizes that respective candidate generative AI assistant plugin; and including the set of one or more positive example rewrites that characterizes that respective candidate generative AI assistant plugin in a text characterization, of the set of text characterizations, that characterizes that respective candidate generative AI assistant plugin.

7. The method of claim 4, wherein:

each text characterization of the set of text characterizations characterizes one respective candidate generative artificial intelligence (AI) assistant plugin of the set of candidate generative AI assistant plugins; and each text characterization of the set of text characterizations comprises:

a moniker for the one respective candidate generative AI assistant plugin characterized by the text characterization, a description of the one respective candidate generative AI assistant plugin characterized by the text characterization, and the set of one or more positive example rewrites that characterizes that respective candidate generative AI assistant plugin.

8. The method of claim 4, wherein:

the set of text passages are retrieved from a text passage retrieval service;

the text passage retrieval service uses a set of one or more indexes to determine that the set of text passages are relevant to the text passage search query;

the text completion is generated by a large language model of the large language model service;

the large language model is not trained based on the set of text passages; and the set of one or more indexes is updated to index the set of text passages more recently than a most recent training of the large language model.

9. The method of claim 4, wherein the particular generative AI assistant plugin indicated by the text completion represents a determination by the Large Language Model (LLM) that the current user input is out-of-scope.

10. The method of claim 4, wherein the text completion specifies the plugin query.

11. The method of claim 4, wherein the large language model text prompt is generated to comprise a conversational history of the user-agent conversation.

12. The method of claim 4, wherein the current user input comprises a digital audio, a digital video, or a digital image; and wherein the method further comprises:

generating the current user text input based on the digital audio, the digital video, or the digital image.

13. The method of claim 4, further comprising:

generating the large language model text prompt to include a decision request, the decision request requesting the large language model service to respond with an identifier of a candidate generative AI assistant plugin of the set of candidate generative artificial intelligence (AI) assistant plugins or respond in a specified way if the current user text input is out-of-scope.

14. The method of claim 4, further comprising:

generating the text passage search query based on the current user input.

15. The method of claim 4, further comprising:

generating the current user text input based on the current user input.

16. A system comprising:

one or more programmable electronic devices to implement a large language model service in a multi-tenant provider network;

one or more programmable electronic devices in to implement a generative artificial intelligence (AI) assistant service in the multi-tenant provider network, the generative AI assistant service comprising instructions which, when processed, cause the generative AI assistant service to:

receive a current user input of a user-agent conversation;

retrieve a set of text passages relevant to a text passage search query; wherein the text passage search query comprises the current user input or is generated based on the current user input;

send a positive example rewrite search query to a generative AI assistant plugin positive example rewrite retrieval service, wherein the positive example rewrite search query comprises the current user input or is generated based on the current user input;

receive a set of one or more positive example rewrites that characterizes a candidate generative artificial intelligence (AI) assistant plugin of a set of candidate generative AI assistant plugins;

include the set of one or more positive example rewrites that characterizes the candidate generative AI assistant plugin in a text characterization that characterizes the candidate generative AI assistant plugin;

generate a large language model text prompt comprising the set of text passages, a set of text characterizations of the set of candidate generative AI assistant plugins, and a current user text input; wherein the current user text input comprises the current user input or is generated based on the current user input and wherein the set of text characterizations includes the text characterization that characterizes the candidate generative AI assistant plugin;

send the large language model text prompt to the large language model service for completion;

receive a text completion to the large language model text prompt; wherein the text completion is generated by the large language model service; wherein the text completion indicates a particular generative AI assistant plugin of the set of candidate generative AI assistant plugins;

send a plugin query to the particular generative AI assistant plugin;

receive a plugin response to the plugin query;

generate an agent response based on the plugin response; and send the agent response.

17. The system of claim 16, the generative artificial intelligence (AI) assistant service further comprising instructions, which when processed, cause the generative AI assistant service to:

send a text characterization search query to a generative artificial intelligence (AI) assistant plugin text characterization retrieval service; wherein the text characterization search query comprises the current user input or is generated based on the current user input; and receive the set of text characterizations from the generative AI assistant plugin text characterization retrieval service.

18. The system of claim 16, the generative artificial intelligence (AI) assistant service further comprising instructions, which when processed, cause the generative AI assistant service, for each respective candidate artificial intelligence (AI) assistant plugin of the set of candidate generative AI assistant plugins, to:

send a positive example rewrite search query for that respective candidate AI assistant plugin to the generative AI assistant plugin positive example rewrite retrieval service; wherein the positive example rewrite search query for that respective candidate AI assistant plugin comprises the current user input or is generated based on the current user input;

receive a set of one or more positive example rewrites that characterizes that respective candidate generative AI assistant plugin; and include the set of one or more positive example rewrites that characterizes that respective candidate generative AI assistant plugin in a text characterization, of the set of text characterizations, that characterizes that respective candidate generative AI assistant plugin.

19. The system of claim 16, wherein:

each text characterization of the set of text characterizations characterizes one respective candidate generative AI assistant plugin of the set of candidate generative AI assistant plugins; and each text characterization of the set of text characterizations comprises:

a moniker for the one respective candidate generative AI assistant plugin characterized by the text characterization, a description of the one respective candidate generative AI assistant plugin characterized by the text characterization, and the set of one or more positive example rewrites that characterizes that respective candidate generative AI assistant plugin.

20. The system of claim 16, wherein:

the set of text passages are retrieved from a text passage retrieval service;

the text passage retrieval service uses a set of one or more indexes to determine that the set of text passages are relevant to the text passage search query;

the text completion is generated by a large language model of the large language model service; and the large language model is not trained based on the set of text passages.

* * * * *